US010557914B2

(12) United States Patent
Iizuka et al.

(10) Patent No.: US 10,557,914 B2
(45) Date of Patent: Feb. 11, 2020

(54) RADIO WAVE ARRIVAL ANGLE DETECTION DEVICE, VEHICLE DETECTION SYSTEM, RADIO WAVE ARRIVAL ANGLE DETECTION METHOD, AND VEHICLE ERRONEOUS DETECTION PREVENTION METHOD

(71) Applicant: MITSUBISHI HEAVY INDUSTRIES MECHATRONICS SYSTEMS, LTD., Kobe-shi, Hyogo (JP)

(72) Inventors: Kenji Iizuka, Tokyo (JP); Masatoshi Tominaga, Tokyo (JP); Kazuyoshi Kitajima, Tokyo (JP); Saku Ieuji, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 191 days.

(21) Appl. No.: 15/555,804

(22) PCT Filed: Nov. 26, 2015

(86) PCT No.: PCT/JP2015/083257
§ 371 (c)(1),
(2) Date: Sep. 5, 2017

(87) PCT Pub. No.: WO2016/157613
PCT Pub. Date: Oct. 6, 2016

(65) Prior Publication Data
US 2018/0038935 A1    Feb. 8, 2018

(30) Foreign Application Priority Data
Mar. 31, 2015  (JP) ................. 2015-074401

(51) Int. Cl.
*G01S 3/48* (2006.01)
*G01S 5/06* (2006.01)
(Continued)

(52) U.S. Cl.
CPC ............... *G01S 3/48* (2013.01); *G01S 3/043* (2013.01); *G01S 5/02* (2013.01); *G01S 5/06* (2013.01);
(Continued)

(58) Field of Classification Search
CPC ... G01S 3/043; G01S 3/48; G01S 3/64; G01S 5/02; G01S 5/06; H04L 27/2628
(Continued)

(56) References Cited

U.S. PATENT DOCUMENTS

| | | |
|---|---|---|
| 2010/0009644 A1 | 1/2010 | Izumi et al. |
| 2013/0088395 A1 | 4/2013 | Vaarakangas |
| 2014/0327579 A1 | 11/2014 | Hart et al. |

FOREIGN PATENT DOCUMENTS

| | | |
|---|---|---|
| JP | 2001-201550 A | 7/2001 |
| JP | 2003-258762 A | 9/2003 |

(Continued)

OTHER PUBLICATIONS

PCT/ISA/210, "International Search Report for International Application No. PCT/JP2015/083257," dated Mar. 1, 2016.
(Continued)

*Primary Examiner* — Dao L Phan
(74) *Attorney, Agent, or Firm* — Manabu Kanesaka; Kenneth Berner; Benjamin Hauptman

(57) ABSTRACT

A radio wave arrival angle detection device of the present invention extracts symbols and resolves the same into subcarriers having various frequency components, for OFDM carrier waves received by a first antenna and a second antenna, respectively. The arrival angle of the carrier waves
(Continued)

is calculated on the basis of the geometric relationship between a phase shift of the respective sub-carriers of the OFDM carrier waves received by the first antenna and the second antenna, and the arrangement of the first antenna and the second antenna.

12 Claims, 15 Drawing Sheets

(51) Int. Cl.
  *G01S 3/04* (2006.01)
  *G01S 5/02* (2010.01)
  *H04L 27/26* (2006.01)
(52) U.S. Cl.
  CPC ...... *H04L 27/2601* (2013.01); *H04L 27/2628* (2013.01)
(58) Field of Classification Search
  USPC ........................................................ 342/387
  See application file for complete search history.

(56) References Cited

FOREIGN PATENT DOCUMENTS

| | | |
|---|---|---|
| JP | 2005-140768 A | 6/2005 |
| JP | 2005-348278 A | 12/2005 |
| JP | 2009-212771 A | 9/2009 |
| JP | 2010-019803 A | 1/2010 |
| JP | 2010-060459 A | 3/2010 |
| JP | 2010-258791 A | 11/2010 |
| JP | 2010-276531 A | 12/2010 |
| WO | 2012/100240 A2 | 7/2012 |
| WO | 2013/118557 A1 | 8/2013 |

OTHER PUBLICATIONS

PCT/ISA/237 "Written Opinion of the International Searching Authority for International Application No. PCT/JP2015/083257," dated Mar. 1, 2016.

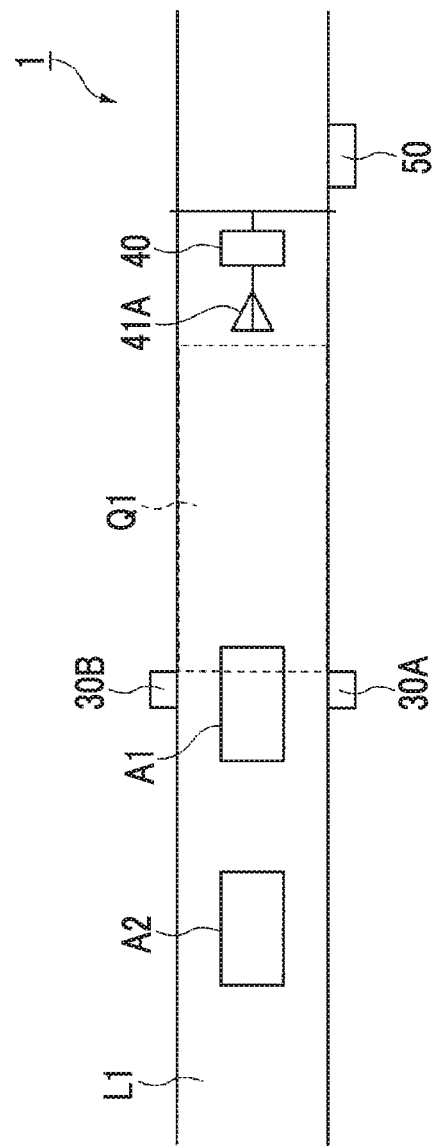

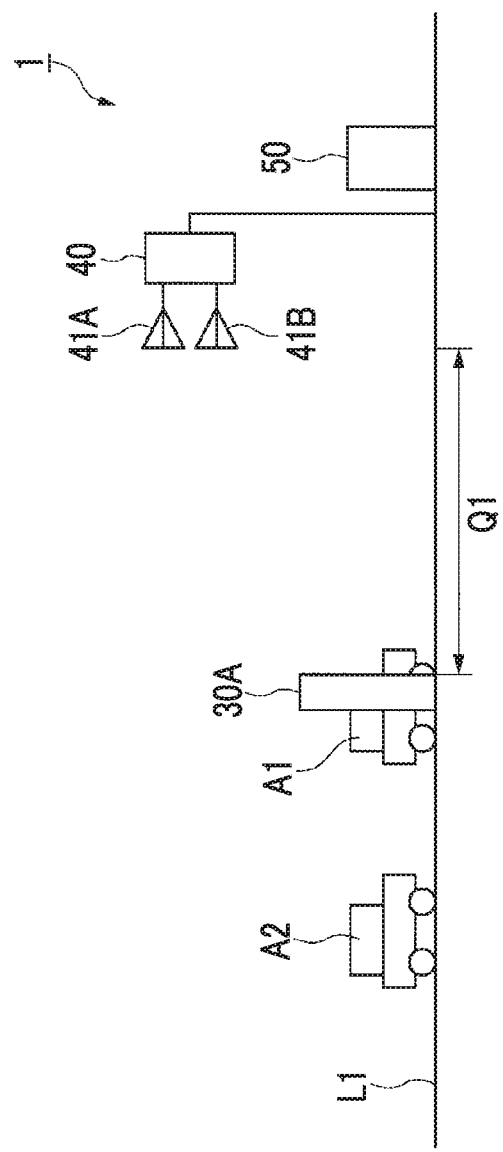

RADIO WAVE ARRIVAL ANGLE DETECTION DEVICE, VEHICLE DETECTION SYSTEM, RADIO WAVE ARRIVAL ANGLE DETECTION METHOD, AND VEHICLE ERRONEOUS DETECTION PREVENTION METHOD

TECHNICAL FIELD

The present invention relates to radio wave arrival angle detection device, a vehicle detection system, a radio wave arrival angle detection method, and a vehicle erroneous detection prevention method.

Priority is claimed on Japanese Patent Application No. 2015-074401, filed Mar. 31, 2015, the content of which is incorporated herein by reference.

BACKGROUND ART

Currently, there is provided a wireless road charge reception system including a vehicle detector that is provided to a road side strip that performs detection of a vehicle that passes through a road, and a road side antenna that performs a radio communication with the an in-vehicle device that is mounted on a vehicle that passes through the vehicle detector. The wireless road charge reception system has a mechanism in which a vehicle is specified by regarding a vehicle that is detected by the vehicle detector and a vehicle that performs a radio communication are regarded as the same vehicle, and charging is performed with respect to the vehicle that is specified.

In the current wireless road charge reception system, a communication between the antenna and the in-vehicle device is performed in a dedicated short range communications (DSRC) type, and in a next generation wireless road charge reception system, a radio communication type called wave (IEEE802.11p) is scheduled to be employed. The DSRC type corresponds to a communication with a single carrier wave, but a wave type is an orthogonal frequency-division multiplexing (OFDM) type in which a plurality of carrier waves are multiplexed.

Furthermore, PTL 1 discloses a method of securing communication quality by calculating an arrival angle of a communication radio wave in the OFDM type, and by matching a main lobe of an antenna to the angle.

CITATION LIST

Patent Literature

[PTL 1] Japanese Unexamined Patent Application Publication No. 2005-348278

SUMMARY OF INVENTION

Technical Problem

In the current wireless road charge reception system, in a case where a vehicle A detected by the vehicle detector cannot perform a communication with the road side antenna due to a certain reason, another vehicle B, which travels the vicinity of the vehicle A, may perform a communication with the road side antenna. In this case, the wireless road charge reception system may recognize a vehicle, which is detected by the vehicle detector, as the vehicle B, and may erroneously charge the vehicle B. With regard to this problem, for example, it may be considered that a vehicle is specified with an arrival angle of a radio wave that is used in the radio communication, and the like. However, in carrier waves of the OFDM type, a plurality of sub-carrier waves (sub-carriers) are multiplexed, and thus there is a problem that an arrival angle calculation method of the related art cannot be used.

An object of the invention is to provide a radio wave arrival angle detection device, a vehicle detection system, a radio wave arrival angle detection method, and a vehicle erroneous detection prevention method which are capable of solving the above-described problem.

Solution to Problem

According to a first aspect of the invention, there is provided a radio wave arrival angle detection device including: a carrier wave resolving unit that resolves a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other; and an arrival angle calculation unit that calculates an arrival angle of the first carrier wave at the first antenna or an arrival angle of the second carrier wave at the second antenna on the basis of a geometric relationship between a phase difference between a first sub-carrier wave selected from a first sub-carrier wave group obtained by resolving the first carrier wave by the carrier wave resolving unit, and a second sub-carrier wave that is selected from a second sub-carrier wave group obtained by resolving the second carrier wave by the carrier wave resolving unit and has the same frequency as a frequency of the first sub-carrier wave, and arrangement positions of the first antenna and the second antenna.

According to a second aspect of the invention, the radio wave arrival angle detection device may further include a smoothing unit that selects a set of the first sub-carrier wave and the second sub-carrier wave which have the same frequency with respect to a plurality of frequencies, and smooths an arrival angle obtained through calculation by the arrival angle calculation unit for each of the frequencies.

According to a third aspect of the invention, the radio wave arrival angle detection device may further include a unit signal extraction unit that extracts a unit signal, which constitutes the carrier wave, by detecting a redundant signal that is applied to a head of the unit signal. The unit signal extraction unit may extract a first unit signal from the first carrier wave and a second unit signal from the second carrier wave, respectively, the carrier wave resolving unit may resolve the first unit signal into the first sub-carrier wave group, and the second unit signal into the second sub-carrier wave group, respectively, and the arrival angle calculation unit may calculate the arrival angle on the basis of the geometric relationship between the phase difference between the first sub-carrier wave selected from the first sub-carrier wave group, and the second sub-carrier wave that is selected from the second sub-carrier wave group and has the same frequency as a frequency of the first sub-carrier wave, and the arrangement positions of the first antenna and the second antenna.

According to a fourth aspect of the invention, the radio wave arrival angle detection device may further include: an intermediate frequency band conversion unit that converts a frequency of the carrier wave into an intermediate frequency; and a sampling unit that samples three or greater partial signals having a predetermined length from the carrier wave, which is converted by the intermediate frequency band conversion unit, with the passage of time. The carrier wave resolving unit may resolve each of three or greater partial signals, which are sampled from the first carrier wave by the sampling unit, into a first sub-carrier wave group corresponding to each of the partial signals, and resolves each of three or greater partial signals, which are sampled from the second carrier wave, into a second sub-carrier wave group corresponding to each of the partial signals, and with respect to all sets of the first sub-carrier wave group and the second sub-carrier wave group in which sampling time is set to the same as each other, the arrival angle calculation unit may compare arrival angle calculation values calculated by using the first sub-carrier wave selected from the first sub-carrier wave group and the second sub-carrier wave that is selected from the second sub-carrier wave group and has the same frequency as a frequency of the first sub-carrier wave in each of the sets, and calculates the arrival angle on the basis of a plurality of the arrival angle calculation values in which a difference of the arrival angle calculation values is in a predetermined range.

According to a fifth aspect of the invention, the radio wave arrival angle detection device may further include a signal processing unit that calculates the arrival angle of the carrier wave on the basis of signal processing with respect to an amplitude and a phase of the sub-carrier wave included in the carrier wave that is received by a plurality of antenna elements of an array antenna.

According to a six aspect of the invention, the radio wave arrival angle detection device may further include a position estimation unit that calculates a transmission position of the carrier wave by using reception time or radio wave intensity of the carrier wave that is received by each of two or greater antennas. The arrival angle calculation unit may calculate the arrival angle using an arrival angle of the carrier wave based on the transmission position that is represented by a positional relationship between the transmission position and the first antenna or the second antenna.

According to a seventh aspect of the invention, the radio wave arrival angle detection device may further include an angle calculation execution determination unit that determines whether or not to perform calculation of the arrival angle on the basis of a magnitude of a phase difference or a difference in signal level which is obtained through comparison between a plurality of the sub-carrier waves. The arrival angle calculation unit may perform calculation of an arrival direction only in a case where the angle calculation execution determination unit makes a determination as execution of calculation of the arrival direction.

In the radio wave arrival angle detection device according to an eighth aspect of the invention, when the magnitude of the phase difference or the difference signal level between the first sub-carrier wave and the second sub-carrier wave, which have the same frequency, is greater than a predetermined threshold value, the angle calculation execution determination unit may make a determination as non-execution of calculation of the arrival angle.

In the radio arrival angle detection device according to a ninth aspect of the invention, with respect to at least one of the first sub-carrier wave group and the second sub-carrier wave group, the angle calculation execution determination unit may compare signal levels between a plurality of sub-carrier waves included in the sub-carrier wave group, and may make a determination as non-execution of calculation of the arrival angle when a magnitude of the difference in signal level is greater than a predetermined threshold value.

According to a tenth aspect of the invention, there is provided a vehicle detection system including: the radio wave arrival angle detection device according to any one of the aspects; and an erroneous detection prevention device. The erroneous detection prevention device includes an erroneous detection determination unit that determines whether or not the arrival angle calculated by the radio wave arrival angle detection device is included in a predetermined angle range corresponding to a position at which a vehicle to be detected exists.

According to an eleventh aspect of the invention, there is provided a radio wave arrival angle detection method including: a step of resolving a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other; and a step of calculating an arrival angle of the first carrier wave at the first antenna or an arrival angle of the second carrier wave at the second antenna on the basis of a geometric relationship between a phase difference between a first sub-carrier wave selected from a first sub-carrier wave group obtained by resolving the first carrier wave, and a second sub-carrier wave that is selected from a second sub-carrier wave group obtained by resolving the second carrier wave and has the same frequency as a frequency of the first sub-carrier wave, and arrangement positions of the first antenna and the second antenna.

According to a twelfth aspect of the invention, there is provided a vehicle erroneous detection prevention method including: a step of resolving a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other; a step of calculating an arrival angle of the first carrier wave at the first antenna or an arrival angle of the second carrier wave at the second antenna on the basis of a geometric relationship between a phase difference between a first sub-carrier wave selected from a first sub-carrier wave group obtained by resolving the first carrier wave, and a second sub-carrier wave that is selected from a second sub-carrier wave group obtained by resolving the second carrier wave and has the same frequency as a frequency of the first sub-carrier wave, and arrangement positions of the first antenna and the second antenna; and a step of determining whether or not the arrival angle that is calculated is included in a predetermined angle range corresponding to a position at which a vehicle to be detected exists.

Advantageous Effects of Invention

According to the radio wave arrival angle detection device, the vehicle detection system, the radio wave arrival angle detection method, and the vehicle erroneous detection prevention method, it is possible to detect an arrival angle of carrier waves in an OFDM type radio communication. According to this, it is possible to prevent erroneous detection of a vehicle.

BRIEF DESCRIPTION OF DRAWINGS

FIG. 1A is a first view illustrating an overview of a vehicle detection system according to a first embodiment of the invention.

FIG. 1B is a second view illustrating the overview of the vehicle detection system according to the first embodiment of the invention.

DESCRIPTION OF EMBODIMENTS

<First Embodiment>

Figure 2:
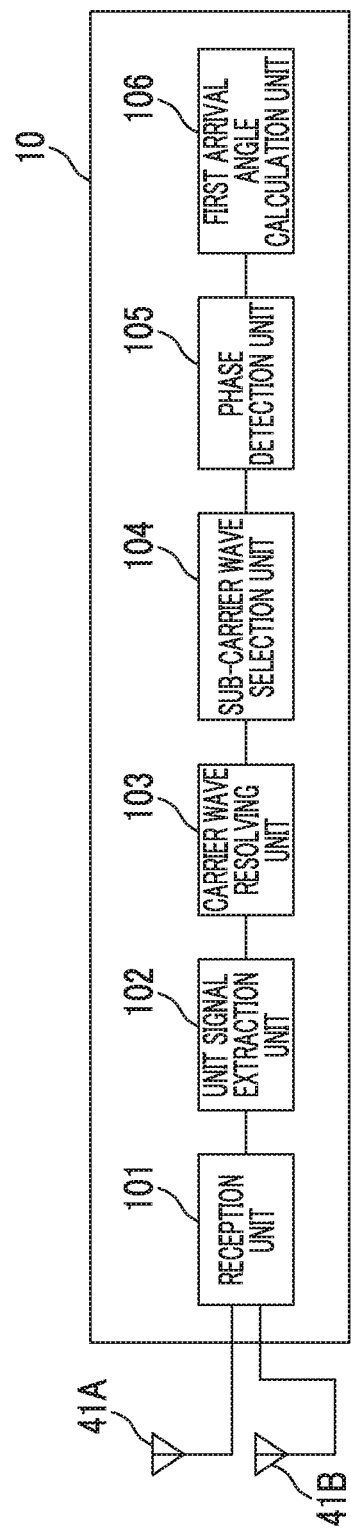
FIG. 2 is a view illustrating a functional configuration of a radio wave arrival angle detection device according to the first embodiment of the invention.

Hereinafter, description will be given of a vehicle detection system according to a first embodiment of the invention with reference to FIG. 1A to FIG. 5.

FIG. 1A is a first view illustrating an overview of the vehicle detection system according to the first embodiment of the invention.

FIG. 1B is a second view illustrating an overview of the vehicle detection system according to the first embodiment of the invention.

FIG. 1A is a view from an upper side of the vehicle detection system 1. FIG. 1B is a view from a lateral side of the vehicle detection system 1. A vehicle detection system 1 is provided at an entrance of a toll section of a road, and the like. The vehicle detection system 1 performs an OFDM type radio communication with an exclusive in-vehicle device that is mounted on vehicles A1, A2, and the like which travel along a lane L1 and detects a vehicle that enters the toll section.

As illustrated in FIG. 1A and FIG. 1B, the vehicle detection system 1 includes a radio communication device 40, a vehicle detector 30A, and a vehicle detector 30B. The vehicle detector 30A and the vehicle detector 30B are provided on a road side of the lane L1, determine presence or absence of a vehicle body of the vehicles A1 and A2 which travel along the lane L1, and detect passage for each of the vehicles A1 and A2. For example, a projector is provided in the vehicle detector 30A, and a light-receiving sensor is provided in the vehicle detector 30B. When the vehicle A1, which enters the lane L1, blocks off the light projected from the projector of the vehicle detector 30A, the light-receiving sensor of the vehicle detector 30B detects passage of the vehicle A1, and transmits a detection signal to a road side charging system 50 to be described later. The road side charging system 50 performs charging processing in accordance with electronic payment and the like.

The radio communication device 40 is provided on an upper side of a road in the vicinity of a toll section entrance, and performs a radio communication for charging processing with the vehicle A1 (in-vehicle device thereof) that enters a communication-possible area Q1 that is defined in advance on the lane L1. The radio communication device 40 includes at least two antennas (an antenna 41A and an antenna 41B) which are used for the radio communication with the vehicle A1 and are arranged on an upper side and a lower side in a direction perpendicular to the ground. As to be described later, the antennas 41A and 41B are used to detect an arrival angle of radio waves from the in-vehicle device mounted on the vehicle A1. The radio communication device 40 fetches various pieces of information (identification information of the in-vehicle device and the like) which are registered in the in-vehicle device of the vehicle A1 and are necessary for charging for the vehicle A1 through a radio communication with the vehicle A1 that enters the communication-possible area Q1, and transmits the various pieces of information to the road side charging system 50. The radio communication device 40 transmits information necessary for charging such as identification information (tollgate information) of the toll section entrance and time at which a communication is performed to the vehicle A1, and registers the various pieces of information in the in-vehicle device of the vehicle A1.

When receiving a detection signal from the vehicle detector 30B, the road side charging system 50 determines that a vehicle corresponding to the information received from the radio communication device 40 is a vehicle that is an object to be charged, for example, in predetermined time after receiving the detection signal. The road side charging system 50 performs charging processing with respect to the vehicle that is an object to be charged.

Here, in FIG. 1A and FIG. 1B, it is assumed that the radio communication device 40 provided in correspondence with the lane L1 performs a radio communication with the vehicle A1 that enters the communication-possible area Q1 defined on the lane L1. However, in operation of the vehicle detection system 1, radio wave reflection, which is not assumed, may occur due to existence of a building, a traveling vehicle, and other obstacles at the periphery of the vehicle detection system 1. For example, radio waves, which are transmitted from an in-vehicle device of the vehicle A2 that travels immediately after the vehicle A1, may arrive at the radio communication device 40 through reflection from the obstacles and the like. In this case, the radio communication device 40 erroneously recognizes that the arrived radio waves are transmitted from the vehicle A1. In addition, the road side charging system. 50 erroneously correlates information, which is included in the radio waves erroneously recognized by the radio communication device 40, of the in-vehicle device mounted on the vehicle A2, and the vehicle A1 that is detected by the vehicle detector 30B. Accordingly, an error occurs in charging processing to be performed later.

Accordingly, the vehicle detection system according to this embodiment has a function of detecting an arrival angle of radio waves transmitted from an in-vehicle device mounted on a vehicle through the above-described antennas 41A and 41B, and determines whether or not a radio communication is performed with a vehicle (the vehicle A1) as an object to be charged on the basis of a detection value of the arrival angle. Specifically, the radio communication device 40 includes a radio wave arrival angle detection device 10 and an erroneous detection prevention device 20, and the radio wave arrival angle detection device 10 calculates an arrival angle of radio waves transmitted from the in-vehicle device, and the erroneous detection prevention device 20 determines whether or not a communication with a vehicle as an object to be charged is performed. Next, description will be given of the radio wave arrival angle detection device 10.

The radio wave arrival angle detection device 10 is a device that resolves a partial signal (a multi-carrier symbol signal), which is extracted from a single unit signal among a plurality of unit signals (symbols) which constitute signals transmitted by a first carrier wave and a second carrier wave, into a sub-carrier wave group (sub-carrier component signal group) for each frequency with respect to the first carrier wave (OFDM type carrier wave) that is received by a first antenna (antenna 41A) and the second carrier wave that is received by a second antenna (antenna 42A), and calculates an arrival angle of the first carrier wave at the first antenna or an arrival angle of the second carrier wave at the second antenna on the basis of a geometric relationship between a phase difference between a first sub-carrier wave (sub-carrier A$\alpha$) selected from a first sub-carrier wave group and a second sub-carrier wave (sub-carrier B$\alpha$) that is selected from a second sub-carrier wave group and has the same frequency as a frequency of the first sub-carrier wave (sub-carrier A$\alpha$) among sub-carrier wave groups obtained by resolving the partial signal, and arrangement positions of the first antenna and the second antenna. Particularly, in this embodiment, a unit signal extraction unit 102 extracts a first unit signal that constitutes the first carrier wave or a second unit signal that constitutes the second carrier wave by detecting a redundant signal (guard interval) that is applied to a head of the unit signals.

FIG. 2 is a view illustrating a functional configuration of the radio wave arrival angle detection device according to the first embodiment of the invention.

As illustrated in FIG. 2, the radio wave arrival angle detection device 10 includes a reception unit 101, a unit signal extraction unit 102, a carrier wave resolving unit 103, a sub-carrier wave selection unit 104, a phase detection unit 105, and a first arrival angle calculation unit 106.

The reception unit 101 acquires carrier waves which are received by the antenna 41A and the antenna 41B and are multiplexed in an orthogonal frequency-division multiplexing (OFDM) type. The OFDM is a multiplexing type that overlaps transmission data to each of a plurality of sub-carrier waves which have frequencies different from each other and are orthogonal to each other, and modulates the plurality of sub-carrier waves in inverse fast Fourier transform (IFFT) to generate one carrier wave. The reception unit 101 includes a low-noise amplifier (LNA) and an automatic gain circuit (AGC) that. corrects a reception level of the carrier wave that is acquired. The reception unit 101 converts a carrier wave that is adjusted by the LNA and the AGC into a digital signal (multi-carrier signal), and outputs the digital signal to the unit signal extraction unit 102. Specifically, the reception unit 101 converts each of the carrier waves, which are received by the antenna 41A and the antenna 41B, into a multi-carrier signal, and outputs the multi-carrier signal to the unit signal extraction unit 102. The multi-carrier signal of the carrier wave received by the antenna 41A is set as a multi-carrier signal A, and the multi-carrier signal of the carrier wave received by the antenna 41B is set as a multi-carrier signal B.

The unit signal extraction unit 102 is a functional unit that extracts one symbol (unit signal) from the multi-carrier signal that is acquired from the reception unit 101. The unit signal extraction unit 102 has an automatic frequency control (AFC) function and a guard interval detection function. First, the unit signal extraction unit 102 performs an automatic frequency control (AFC) with respect to the multi-carrier signal to correct an error of a frequency between transmission side and a reception side. Next, the unit signal extraction unit 102 detects the guard interval that is applied to a head of a symbol with the guard interval detection function so as to extract arbitrary one symbol that is included in the multi-carrier signal. The guard interval represents a redundant signal that is applied to the head of the symbol so as to prevent inter-symbol interference due to a multi-path delay wave. In the OFDM, a trailing end portion of the symbol is set as the guard interval, and the guard interval is copied to the head of the symbol. For example, the unit signal extraction unit 102 uses the above-described characteristics, and detects the guard interval by acquiring a correlation between a portion in which the multi-carrier signal exists and a portion that arrives late by one wavelength of the multi-carrier signal. When detecting the guard interval, the unit signal extraction unit 102 extracts a multi-carrier symbol signal by extracting a signal of a portion that continues from a guard interval and corresponds to a predetermined length of one symbol. The unit signal extraction unit 102 performs extraction of the symbol with respect to the multi-carrier signal A and the multi-carrier signal B, and outputs the multi-carrier symbol signal, which is extracted, to the carrier wave resolving unit 103. A multi-carrier symbol signal, which is extracted from the multi-carrier signal A, is set as a multi-carrier symbol signal A, and a multi-carrier symbol signal, which is extracted from the multi-carrier signal B, is set as a multi-carrier symbol signal B. The unit signal extraction unit 102 outputs start timing of the symbol to the phase detection unit 105.

Here, extraction of the signal of the single symbol from the multi-carrier signal is performed to prevent extraction of signals including a plurality of phases over symbols. When the plurality of phases are included, there is a possibility that a deviation of the phases may have an effect on a carrier wave arrival angle that is calculated in a subsequent process. Accordingly, the unit signal extraction unit 102 extracts a signal from one symbol. Furthermore, even though a length of the signal that is extracted is not the same as a symbol length, the length of the signal may be equal to or less than a length of one symbol.

The carrier wave resolving unit 103 performs fast Fourier transform (FFT) with respect to the multi-carrier symbol signal, which is acquired, to resolve the multi-carrier symbol signal into component signals of a sub-carrier. The carrier wave resolving unit 103 outputs a sub-carrier component signal group A, which is obtained by resolving the multi-carrier symbol signal A into respective frequency components, to the sub-carrier wave selection unit 104. The carrier wave resolving unit 103 outputs a sub-carrier component signal group B, which is obtained by resolving the multi-carrier symbol signal B into respective frequency components, to the sub-carrier wave selection unit 104.

Here, the reason why the carrier wave resolving unit 103 resolves a multi-carrier symbol signal into frequency components is that it is difficult to use a radio wave arrival angle calculation method of the related art in a carrier wave state in which multi carriers are multiplexed. In a current DSRC type, a communication is performed with a single carrier wave, and thus it is also easy to calculate a radio wave arrival angle. However, in a communication with a next generation OFDM type, it is necessary to extract one sub-carrier that is not multiplexed, and it is necessary to extract a sub-carrier in a range of a single symbol so as not to include a deviation of a phase.

The sub-carrier wave selection unit 104 selects a component signal having an arbitrary one frequency α with respect to the sub-carrier component signal group acquired from the carrier wave resolving unit 103. The sub-carrier wave selection unit 104 selects a component signal (sub-carrier Aα) having the frequency α from the sub-carrier component signal group A, and outputs the component signal to the phase detection unit 105. The sub-carrier wave selection unit 104 selects a component signal (sub-carrier Bα) having the frequency α from the sub-carrier component signal group B, and outputs the component signal to the phase detection unit 105. The phase detection unit 105 detects a phase of the sub-carrier Aα and a phase of the sub-carrier Bα, respectively, on the basis of start timing of the sub-carrier that is acquired from the unit signal extraction unit 102 and the frequency α of the sub-carrier that is acquired from the sub-carrier wave selection unit 104. The phase detection unit 105 outputs the sub-carrier Aα, the sub-carrier Bα, and information of the phases thereof to the first arrival angle calculation unit 106.

The first arrival angle calculation unit 106 calculates an arrival angle of the carrier wave (radio wave) by using the information that is acquired. An arrival angle calculation method will be described with reference to FIG. 3.

Figure 3:
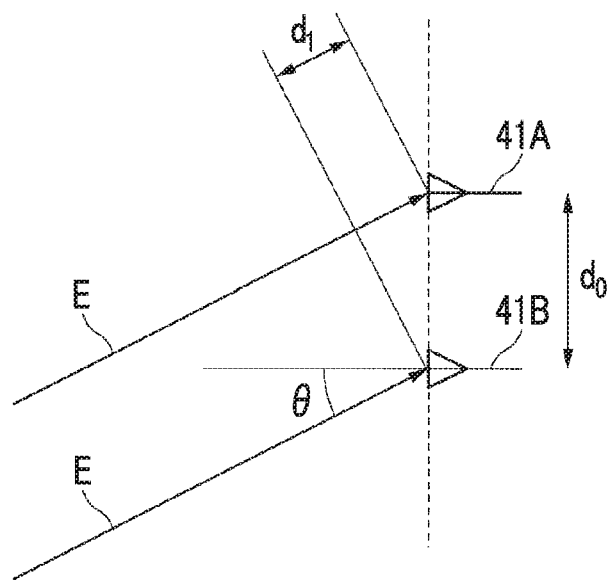
FIG. 3 is a view illustrating a radio wave arrival angle calculation method according to the first embodiment of the invention.

FIG. 3 is a view illustrating a radio wave arrival angle calculation method according to the first embodiment of the invention.

As illustrated in FIG. 3, the antennas 41A and 41B receive a carrier wave E that is a radio wave that is radiated from the in-vehicle device. At this time, the carrier wave E is incident to the antennas 41A and 41B at a predetermined arrival angle θ. Here, the arrival angle θ is an incident angle of the carrier wave E with a plane parallel to the ground set as a reference. An interval between the antenna 41A and the antenna 41B is set as an interval $d_0$.

In this case, in correspondence with a path difference $d_1$ between a carrier wave E received by the antenna 41A and an arrival wave E that is received by the antenna 41B, the phase difference ϕ occurs in the respective carrier waves E. The arrival angle θ can be calculated by the following Expression (1) on the basis of a relational expression ($\phi = (2\pi/\lambda) \times d_1 = (2\pi/\lambda) \times (d_0 \times \sin\theta)$) between the path difference $d_1$ and the phase difference ϕ.

$$\theta = \sin^{-1} \times ((\lambda \times \phi)/(2\pi \times d_0)) \tag{1}$$

Furthermore, "λ" represents a wavelength of a radio wave that is used in a radio communication between the radio communication device 40 and the in-vehicle device. Furthermore, in this embodiment, in the radio communication performed between the radio communication device 40 and the in-vehicle device, for example, a radio wave having a frequency of approximately 5.9 GHz is used. In this case, the wavelength λ is approximately 5 cm.

In this manner, the arrival angle θ can be calculated on the basis of a geometric relationship between the interval between the antenna 41A and the antenna 41B, the wavelength λ of the carrier wave E, and the phase difference ϕ that is determined in correspondence with the arrival angle θ.

The first arrival angle calculation unit 106 calculates the phase difference ϕ from the information of the phases of the sub-carrier Aα and the sub-carrier Bα which respectively correspond to the antenna 41A and the antenna 41B. The first arrival angle calculation unit 106 calculates the wavelength λ from a frequency of the sub-carrier Aα. The first arrival angle calculation unit 106 fetches the interval $d_0$ from a storage unit (not illustrated) that is provided to the radio wave arrival angle detection device 10. The first arrival angle calculation unit 106 substitutes Expression (1) with a plurality of pieces of information as described above to calculate the arrival angle θ. The first arrival angle calculation unit 106 outputs the arrival angle θ, which is calculated, to the erroneous detection prevention device 20.

Next, description will be given of the erroneous detection prevention device 20 with reference to FIG. 4.

Figure 4:
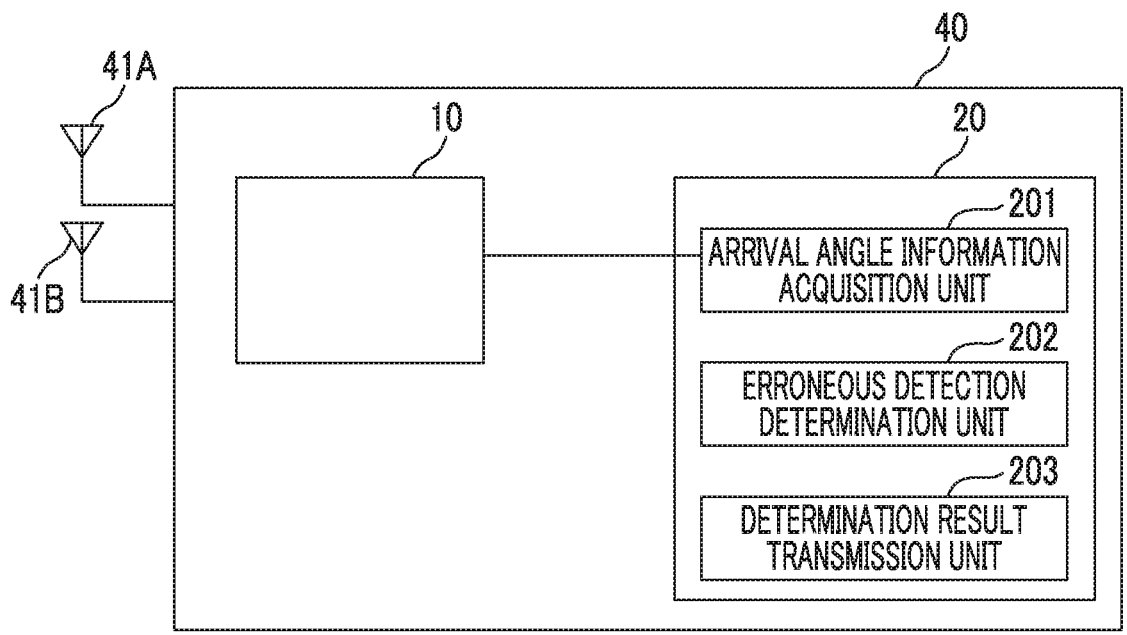
FIG. 4 is a view illustrating a functional configuration of an erroneous detection prevention device according to the first embodiment of the invention.

FIG. 4 is a view illustrating a functional configuration of the erroneous detection prevention device according to the first embodiment of the invention.

As illustrated in FIG. 4, the erroneous detection prevention device 20 includes an arrival angle information acquisition unit 201, an erroneous detection determination unit 202, and a determination result transmission unit 203.

The arrival angle information acquisition unit 201 acquires information of the arrival angle θ, which is calculated by the first arrival angle calculation unit 106, from the radio wave arrival angle detection device 10. The arrival angle information acquisition unit 201 outputs the information of the arrival angle θ to the erroneous detection determination unit 202.

The erroneous detection determination unit 202 determines whether or not a vehicle that is a communication counterpart of the antenna 41A and the antenna 41B is an object to be charged in accordance with whether or not a magnitude of the arrival angle θ is in a predetermined range. Specifically, an angle range, in which straight lines connecting respective positions included in the communication-possible region Q1 and the antennas 41A and 41B, and a plane parallel to the ground are capable of intersecting each other, is calculated in advance. In a case where the arrival angle θ is in the range, the erroneous detection determination unit 202 determines that a vehicle as a communication counterpart is an object to be charged. In a case where the arrival angle θ is out of the range, the erroneous detection determination unit 202 determines that the vehicle as the communication counterpart is a vehicle that is erroneously detected. The erroneous detection determination unit 202 outputs a determination result to the determination result transmission unit 203.

The determination result transmission unit 203 transmits the determination result by the erroneous detection determination unit 202 to the road side charging system 50.

The road side charging system 50 acquires information including the determination result transmitted from the erroneous detection prevention device 20, and performs charging processing with respect to a vehicle of which passage is detected by the vehicle detector 30B in a case where the vehicle with which a radio communication is performed is an object to be charged. For example, when the determination result indicates an erroneously detected vehicle, the road side charging system 50 gives an instruction for the radio communication device 40 to perform a radio communication with a vehicle until the radio communication is possible with a vehicle that is an object to be charged.

Figure 5:
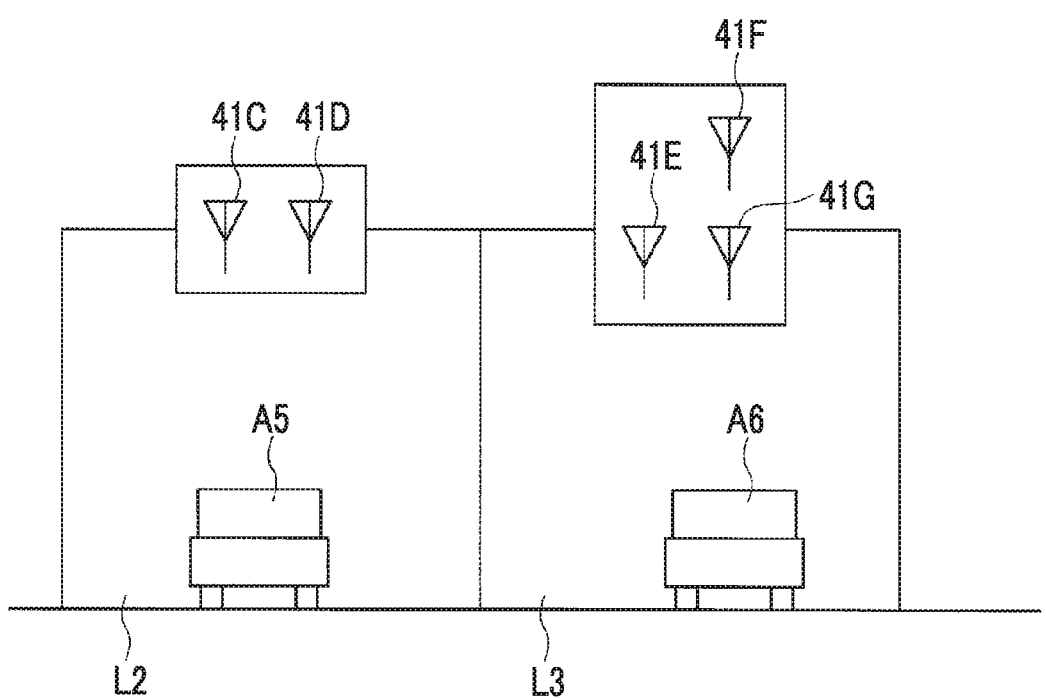
FIG. 5 is a view illustrating another example of antenna arrangement according to the first embodiment of the invention.

FIG. 5 is a view illustrating another example of the antenna arrangement according to the first embodiment of the invention.

In FIG. 5, a vehicle A5 that travels along a lane L2 and a vehicle A6 that travels along a lane L3 are illustrated. In a case where a plurality of lanes exist as described above, there is a possibility that the vehicle A6, which travels along the lane L3, may be erroneously recognized as a vehicle that travels along the lane L2 due to an effect of a reflected wave. In contrast, in a case where antennas are arranged in parallel to each other in a horizontal direction similar to an antenna 41C and an antenna 41D, the vehicle detection system 1 can make a determination on a carrier wave transmitted from the lane L2 or a carrier wave transmitted from the lane L3, for example, on the basis of an arrival angle $θ_T$ of a radio wave received by the antenna 41C, the arrival angle $θ_T$ being calculated on the basis of a geometric relationship between a phase difference between carrier waves received by the antenna 41C and the antenna 41D, and arrangement positions of the antenna 41C and the antenna 41D. Furthermore, the arrival angle $θ_T$ is an angle that is made by a plane that is perpendicular to the ground and a proceeding direction of the lane L2, and the carrier wave.

In addition, similar to antennas 41E, 41F, and 41G on an upper side of the lane L3, in a case where the antenna 41F is provided in a vertical direction and the antenna 41E is provided in horizontal direction with the antenna 41G set as a reference, the vehicle detection system 1 can prevent erroneous recognition between vehicles which travel along the lane L3 in parallel to each other on a front side and on a real side by using the antenna 41G and the antenna 41F, for example, on the basis of an arrival angle of a carrier wave received by the antenna 41G. The vehicle detection system 1 can prevent a vehicle, which travels along the lane L2, from being erroneously recognized as a vehicle that travels along the lane L3 by using the antenna 41G and the antenna 41E, for example, on the basis of the arrival angle of the carrier wave received by the antenna 41G.

According to this embodiment, in the OFDM radio communication type, the radio wave arrival angle detection device 10 extracts a multi-carrier signal that becomes an object to be processed by extracting a single symbol from a carrier wave, selects one signal from a sub-carrier component signal group that is obtained by subjecting the extracted multi-carrier signal to the fast Fourier transform, and perform calculation of the arrival angle θ. Since the multi-carrier symbol signal is extracted from the single symbol, a calculation error of the arrival angle, which occurs due to a phase error between a plurality of symbols in a case of extracting a multi-carrier signal over symbols, does not occur. One sub-carrier is selected, and thus it is possible to calculate the arrival angle θ by using Expression (1). That is, it is also possible to calculate the arrival angle θ of the carrier wave with respect to a carrier wave obtained by multiplexing a plurality of sub-carriers. It is possible to specify a range of a position at which a vehicle as a communication counterpart exists by using the arrival angle θ, and thus it is possible to determine whether or not a radio communication is performed with a desired vehicle. According to this, it is possible to prevent charging processing from being performed with respect to an erroneous vehicle due to confusion of a vehicle.

Furthermore, the reception unit 101, the unit signal extraction unit 102, the carrier wave resolving unit 103, the sub-carrier wave selection unit 104, and the phase detection unit 105, the antenna 41A may employ a configuration in which only either the radio wave received by the antenna 41A or the radio wave received by the antenna 41B is processed. For example, hardware of a reception unit 101A, a unit signal extraction unit 102A, a carrier wave resolving unit 103A, a sub-carrier wave selection unit 104A, and a phase detection unit 105A which process the radio wave received by the antenna 41A, and hardware of a reception unit 101B, a unit signal extraction unit 102B, a carrier wave resolving unit 103B, a sub-carrier wave selection unit 104B, and a phase detection unit 105B which process the radio wave received by the antenna 41B may be different from each other. This is also true of the following embodiments.

The antenna 41A and the antenna 41B are arranged at an interval of one wavelength or less (for example, 0.6 wavelengths) so that a phase difference between direct waves received by respective antennas is within one cycle. The number of antennas, which are arranged, may not be two and may be three or greater. Alternatively, it is possible to employ an array antenna in which a plurality of antenna elements are arranged. In a case where three or greater antenna exist, antennas, which are arranged to be adjacent to each other, are selected as two antennas which are used in calculation of the arrival angle. This is also true of a third embodiment to be described later.

<Second Embodiment>

Hereinafter, description will be given of a vehicle detection system according to a second embodiment of the invention with reference to FIG. 6.

Figure 6:
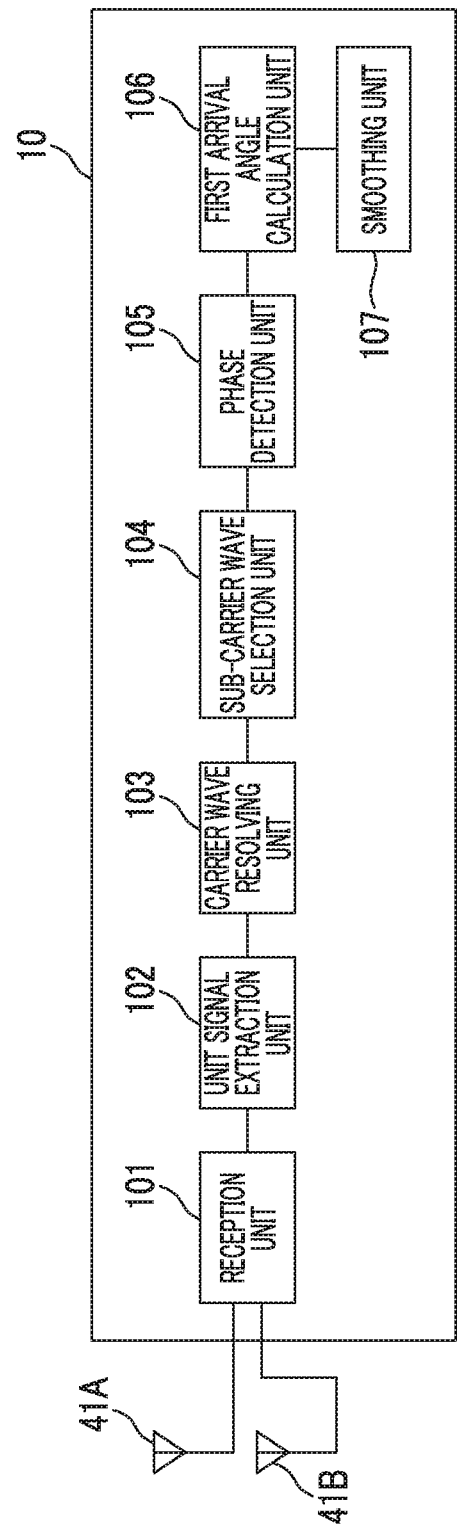
FIG. 6 is a view illustrating a functional configuration of a radio wave arrival angle detection device according to a second embodiment of the invention.

FIG. 6 is a view illustrating a functional configuration of a radio wave arrival angle detection device according to the second embodiment of the invention.

As illustrated in FIG. 6, a radio wave arrival angle detection device 10 includes a reception unit 101, a unit signal extraction unit 102, a carrier wave resolving unit 103, a sub-carrier wave selection unit 104, a phase detection unit 105, a first arrival angle calculation unit 106, and a smoothing unit 107. Description will be given of functional units different from the first embodiment in the configuration.

In this embodiment, the sub-carrier wave selection unit 104 selects a plurality of (for example, N) sets of sub-carriers having the same frequency in the sub-carrier component signal group A and the sub-carrier component signal group B, and outputs the sets to the phase detection unit 105. Sub-carriers, which are selected with respect to the sub-carrier component signal group A, are as sub-carriers $A_1$ to $A_N$, and sub-carriers, which are selected with respect to the sub-carrier component signal group B, are set as sub-carriers $B_1$ to $B_N$. It is assumed that a frequency of a sub-carrier $A_n$ and a frequency of a sub-carrier $B_n$ (n=1 to N) are the same as each other. Furthermore, "the same as each other" is not limited to the meaning in which two frequencies are necessary to completely match each other, and includes meaning in which the two frequencies are included within a permissible error range that is defined in advance.

The phase detection unit 105 detects a phase with respect to each of N sets of sub-carriers (sub-carriers $A_1$ to $A_N$, and sub-carriers $B_1$ to $B_N$), and outputs the phase to the first arrival angle calculation unit 106. The first arrival angle calculation unit 106 calculates a phase difference and a wavelength with respect to the respective N sets of sub-carriers having the same frequency, and calculates arrival angles θ ($θ_1$ to $θ_N$) for each frequency by using Expression (1). The phase detection unit 105 outputs the N arrival angles θ, which are calculated, to the smoothing unit 107.

The smoothing unit 107 calculates a value obtained by smoothing the N arrival angles $θ_1$ to $θ_N$. For example, the smoothing unit 107 calculates an average value of N arrival angles $θ_1$ to $θ_N$. For example, the smoothing unit 107 calculates an average value of (N−2) arrival angles excluding the maximum value and the minimum value among the N arrival angles $θ_1$ to $θ_N$. For example, first, the smoothing unit 107 calculates an average value of the N arrival angles $θ_1$ to $θ_N$, and selects only arrival angles which are in a predetermined range from the average value. The smoothing unit 107 calculates an average value of the arrival angles which are selected. The smoothing unit 107 outputs an arrival angle $θ_x$, which is smoothed by the method, to the erroneous detection prevention device 20.

According to this embodiment, it is possible to exclude data including an error due to fading. According to this, it is possible to calculate a radio wave arrival angle with higher accuracy in addition to the effect of the first embodiment.

Furthermore, in this embodiment the number of the sub-carriers, which are selected by the sub-carrier wave selection unit 104, is arbitrary. For example, the entirety of sub-carriers obtained by the FFT may be selected.

<Third Embodiment>

Hereinafter, description will be given of a vehicle detection system according to a third embodiment of the invention with reference to FIG. 7 to FIG. 9.

Figure 7:
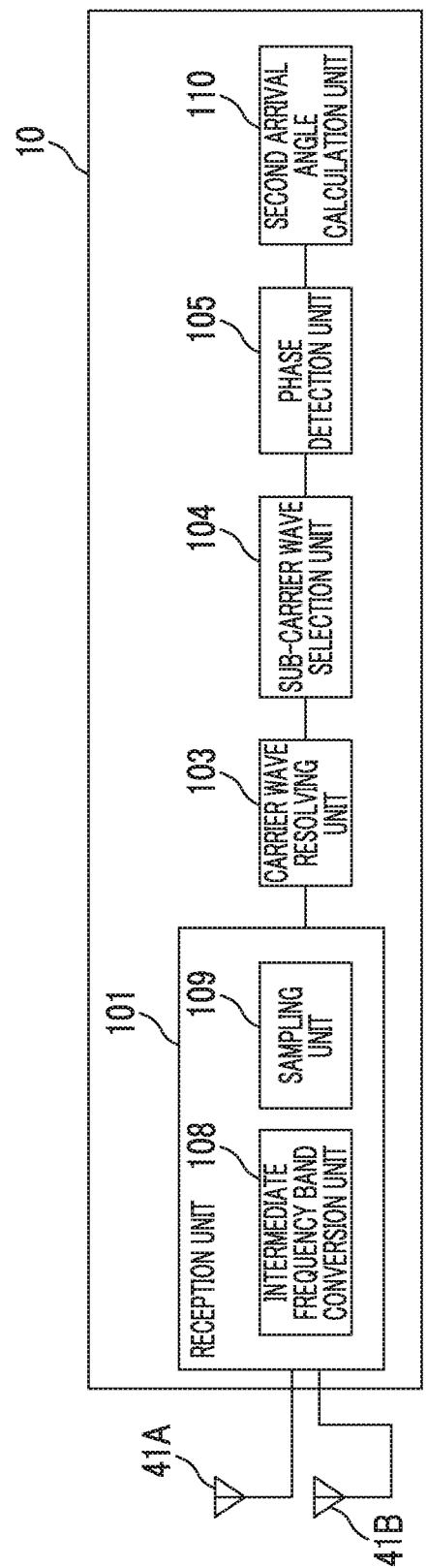
FIG. 7 is a view illustrating a functional configuration of a radio wave arrival angle detection device according to a third embodiment of the invention.

FIG. 7 is a view illustrating a functional configuration of a radio wave arrival angle detection device according to the third embodiment of the invention.

As illustrated in FIG. 7, a radio wave arrival angle detection device 10 includes a reception unit 101, a carrier wave resolving unit 103, a sub-carrier wave selection unit 104, a phase detection unit 105, and a second arrival angle calculation unit 110. The reception unit 101 of the third embodiment includes an intermediate frequency band conversion unit 108 and a sampling unit 109. Description will be given of a functional unit that is different from the first embodiment in the configuration. First, description will be given of the intermediate frequency band conversion unit 108 and the sampling unit 109.

The intermediate frequency band conversion unit 108 down-converts a carrier wave, which is received, to a low frequency (intermediate frequency).

The sampling unit 109 collects at least three multi-carrier partial signals, which have a predetermined data length, from the down-converted carrier wave.

Figure 8:
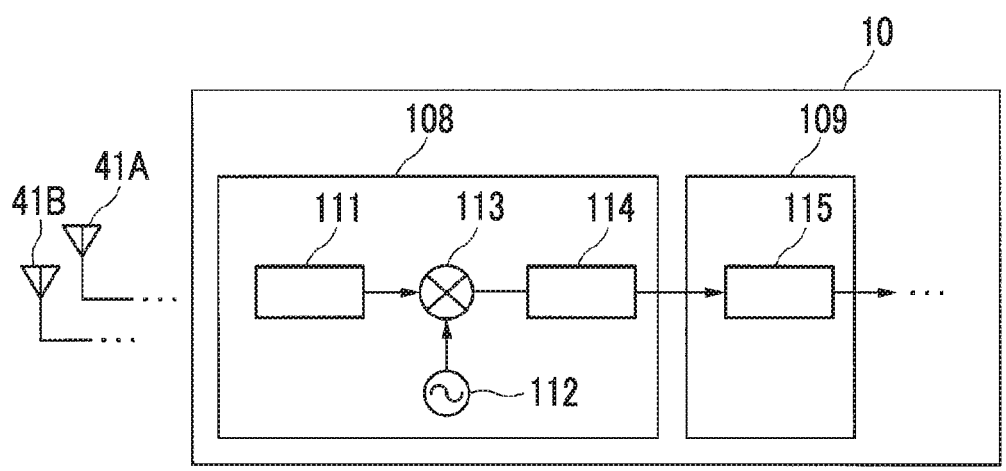
FIG. 8 is a view illustrating a part of a specific configuration example of the radio wave arrival angle detection device according to the third embodiment of the invention.

FIG. 8 is a view illustrating a part of a specific configuration example of the radio wave arrival angle detection device according to the third embodiment of the invention.

For example, the intermediate frequency band conversion unit 108 includes a band-pass filter 111, a local oscillator 112, a mixer 113, and a band-pass filter 114. The band-pass filter 111 performs noise removal with respect to each of the carrier waves received by the antenna 41A and the antenna 41B. The carrier wave, from which a noise is removed, is subjected to frequency conversion into a low frequency by a frequency converter including the local oscillator 112, the mixer 113, and the band-pass filter 114. Here, the conversion into a low frequency is performed so that processing in an A/D converter 115 becomes possible. Furthermore, a low-pass filter may be used instead of the band-pass filter 114. The intermediate frequency band conversion unit 108 outputs the carrier wave, which is down-converted, to the sampling unit 109.

For example, the sampling unit 109 includes the A/D converter 115. The sampling unit 109 samples the carrier wave, which is down-converted by the A/D converter 115, at predetermined timing (time), and outputs a multi-carrier partial signal, which is sampled, to the carrier wave resolving unit 103.

Figure 9:
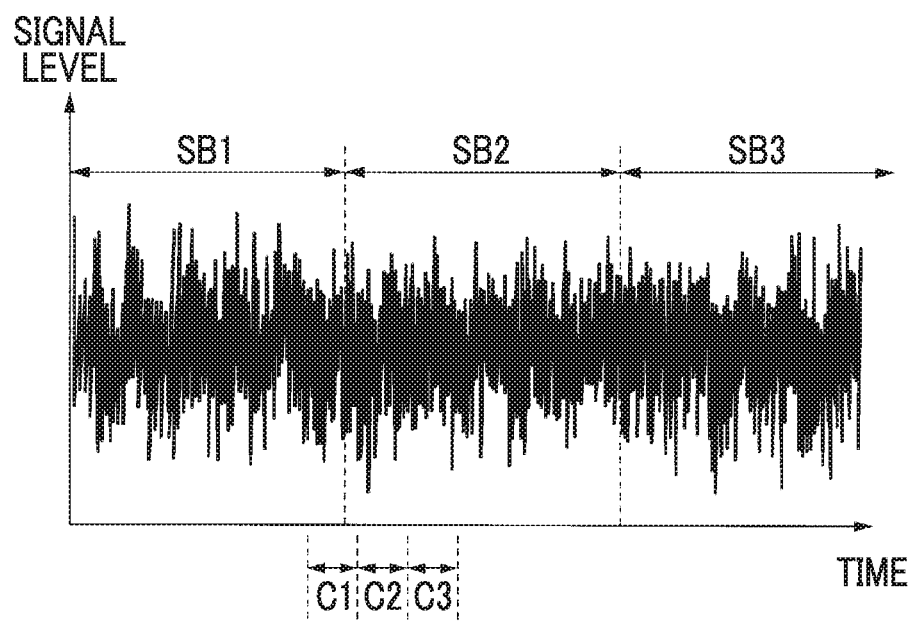
FIG. 9 is a view illustrating a sampling method according to the third embodiment of the invention.

FIG. 9 is a view illustrating a sampling method according to the third embodiment of the invention.

FIG. 9 is a graph illustrating an example of transition of a signal level (signal intensity) of the carrier waves, which are down-converted by the intermediate frequency band conversion unit 108, with the passage of time. The carrier wave illustrated in FIG. 9 includes a symbol SB1, a symbol SB2, and a symbol SB3. Here, it is assumed that the sampling unit 109 samples a section C1, a section C2, and a section C3 from the carrier wave in FIG. 9 with the passage of time. A signal of a portion, in which the symbol SB1 and the symbol SB2 are switched from each other, is included in a multi-carrier partial signal in which the section C1 is sampled. In this case, there is a possibility that an error, which is caused by a deviation in a phase between a sub-carrier of the symbol SB1 and a sub-carrier of the symbol SB2, may occur in an arrival angle that is calculated by using sub-carriers selected from a sub-carrier component signal group that is obtained through the FFT of a multi-carrier partial signal in which the section C1 is sampled. On the other hand, the section C2 and the section C3 are included in the single symbol SB2, and thus the error, which is caused by the deviation in the phase, does not occur in an arrival angle that is calculated by using sub-carriers obtained through the FFT of a multi-carrier partial signal that is sampled from the section C2 and the section C3. For example, in a case of performing the sampling three times, the sampling unit 109 perform the sampling at predetermined timing so that the sampling can be performed twice from a single symbol among the three times. Specifically, the sampling unit 109 performs the sampling so that a length of a sampling section becomes equal to or less than ⅓ of a length of one symbol. In this case, the sampling can be performed twice in a single symbol among three times. In addition, the number of times of sampling is not limited to three times. The sampling may be performed four times as long as the sampling is performed three or more times. In this case, the sampling length is set to be equal to or less than ¼ of one symbol.

Next, description will be given of an arrival angle calculation method according to this embodiment with reference to FIG. 9 as an example.

With respect to the carrier wave that is received by the antenna 41A and is down-converted by the intermediate frequency band conversion unit 108, the sampling unit 109 samples the section C1, the section C2, and the section C3 at predetermined timing (time), and generates a multi-carrier partial signal AC1 corresponding to the section C1, a multi-carrier partial signal AC2 corresponding to the section C2, and a multi-carrier partial signal AC3 corresponding to the section C3. The sampling unit 109 outputs the multi-carrier partial signals AC1, AC2, and AC3 to the carrier wave resolving unit 103. The carrier wave resolving unit 103 performs the FFT with respect to the respective multi-carrier partial signals AC1, AC2, and AC3 for resolving into sub-carriers (sub-carrier component signal groups AC1, AC2, and AC3). This is also true of the carrier wave that is received by the antenna 41B. The sampling unit 109 outputs multi-carrier partial signals BC1, BC2, and BC3, which are obtained by performing sampling with respect to the carrier wave that is received by the antenna 41B and is down-converted by the intermediate frequency band conversion unit 108 at the same timing (time) as the sampling with respect to the carrier wave related to the antenna 41A, and which respectively correspond to the section C1, the section C2, and the section C3, to the carrier wave resolving unit 103. The carrier wave resolving unit 103 performs the FFT with respect to the multi-carrier partial signals BC1, BC2, and BC3 for resolving into sub-carrier component signal groups (sub-carrier components signal groups BC1, BC2, and BC3).

The carrier wave resolving unit 103 outputs the sub-carrier component signal groups AC1 to AC3, and the sub-carrier component signal groups BC1 to BC3 to the sub-carrier wave selection unit 104. The sub-carrier wave selection unit 104 selects a sub-carrier (sub-carrier AC1α) having a predetermined frequency α in the sub-carrier component signal group AC1 corresponding to the section C1. The sub-carrier wave selection unit 104 selects a sub-carrier (sub-carrier BC1α) having the predetermined frequency α in the sub-carrier component signal group BC1 corresponding to the section C1. The sub-carrier wave selection unit 104 outputs the sub-carriers as one set to the phase detection unit 105. The sub-carrier wave selection unit 104 performs the same processing with respect to sub-carriers which are sampled with respect to the section C2 and the section C3, and are resolved for each frequency. Among sub-carriers selected by the sub-carrier wave selection unit 104, a sub-carrier of the section C2, which corresponds to the antenna 41A, is set as a sub-carrier AC2α, a sub-carrier of the section C2, which corresponds to the antenna 41B, is set as sub-carrier BC2α. In the same manner, with regard to the section C3, sub-carriers are set as sub-carrier AC3α and sub-carrier BC3α.

The phase detection unit 105 detects a phase of the sub-carrier AC1α and the like acquired from the sub-carrier wave selection unit 104, and outputs phase information of each of the sub-carriers AC1α, AC2α, and AC3α, and the sub-carriers BC1α, BC2α, and BC3α to the second arrival angle calculation unit 110. Furthermore, a frequency of a sub-carrier that is selected may be different between the sections C1 to C3.

The second arrival angle calculation unit 110 calculates a phase difference and a wavelength by using the sub-carrier AC1α and the sub-carrier BC1α, and calculates an arrival angle $\theta_{C1}$ with respect to the section C1 by using Expression (1). In the same manner, the second arrival angle calculation unit 110 calculates an arrival angle $\theta_{C2}$ with respect to the section C2 by using the sub-carrier AC2α and the sub-carrier BC2α. In addition, the second arrival angle calculation unit 110 calculates an arrival angle $\theta_{C3}$ with respect to the section C3 by using the sub-carrier AC3α and the sub-carrier BC3α. Next, the second arrival angle calculation unit 110 compares the arrival angles $\theta_{C1}$, $\theta_{C2}$, and $\theta_{C3}$ with each other. Here, when it is assumed that both of the sub-carrier AC1α and the sub-carrier BC1α are signals which are sampled over a plurality of symbols (for example, the symbols SB1 and SB2), the sub-carrier AC1α and the sub-carrier BC1α include a phase error due to symbol switching. Accordingly, there is a possibility that the arrival angle $\theta_{C1}$, which is calculated on the basis of the sub-carrier AC1α and the sub-carrier BC1α, may deviate from the arrival angles $\theta_{C2}$ and $\theta_{C3}$ which are calculated on the basis of a signal sampled from a single symbol. The second arrival angle calculation unit 110 compares $|\theta_{C1}-\theta_{C2}|$, $|\theta_{C2}-\theta_{C3}|$, and $|\theta_{C3}-\theta_{C1}|$ with each other, and selects a combination of the arrival angles of a case where the absolute values are within a predetermined range. For example, in a case where a value of $|\theta_{C2}-\theta_{C3}|$ is within the smallest predetermined range, the second arrival angle calculation unit 110 selects $\theta_{C2}$ and $\theta_{C3}$. The second arrival angle calculation unit 110 calculates the final arrival angle on the basis of $\theta_{C2}$ and $\theta_{C3}$ which are selected. For example, the second arrival angle calculation unit 110 calculates an average of $\theta_{C2}$ and $\theta_{C3}$ which are selected, and determines the value as an arrival angle of a carrier wave.

In the first embodiment, a partial signal in a single symbol is extracted by setting the guard interval as a mark. In this embodiment, the radio wave arrival angle detection device 10 resolves three or greater partial signals (multi-carrier partial signals), which are sampled from the carrier wave with the passage of time, into sub-carrier wave groups (sub-carrier component signal groups) corresponding to the respective partial signals. In addition, with respect to the entirety of sets of the first sub-carrier wave group and the second sub-carrier wave group in which the sampling time is the same as each other (for example, a set of the sub-carrier component signal groups AC1 and BC1, a set of the sub-carrier component signal groups AC2 and BC2, and a set of the sub-carrier component signal groups AC3 and BC3), the radio wave arrival angle detection device 10 compares arrival angle calculation values which are calculated by using the first sub-carrier wave (for example, the sub-carrier AC1α) selected from the first sub-carrier wave group, and the second sub-carrier wave (for example, sub-carrier BC1α) selected from the second sub-carrier wave group in accordance with Expression (1), and calculates the arrival angle on the basis of a plurality of arrival angle calculation values (for example, $\theta_{C2}$ and $\theta_{C3}$) in which a difference ($|\theta_{C2}-\theta_{C3}|$, and the like) of the arrival angle calculation values is within a predetermined range.

According to this embodiment, the sampling unit 109 samples a plurality of multi-carrier partial signals in a single symbol instead of the symbol extraction by the unit signal extraction unit 102 in the first embodiment. As described with respect to a case where the sampling is performed three times, even in a case where one signal including symbol switching is sampled, sampling can be performed twice in a single symbol. When comparing the arrival angle calculation values, which are calculated by using respective sampled signal in accordance with Expression (1), with each other, it is considered that it is possible to exclude a radio wave arrival angle calculation value based on the signal including the symbol switching. As a result, according to this embodiment, it is possible to calculate a radio wave arrival angle on the basis of radio wave arrival angle calculation values calculated by using a plurality of signals which are sampled in a single symbol. According to this, the same effect as in the first embodiment is obtained. According to this embodiment, it is not necessary to have the automatic frequency control function, the guard interval detection function, and the like similar to the first embodiment, and thus it is possible to sample a multi-carrier partial signal from the inside single symbol in a more simple manner.

Furthermore, this embodiment can be combined with the second embodiment.

<Fourth Embodiment>

Hereinafter, description will be given of a vehicle detection system according to a fourth embodiment of the invention with reference to FIG. 10.

Figure 10:
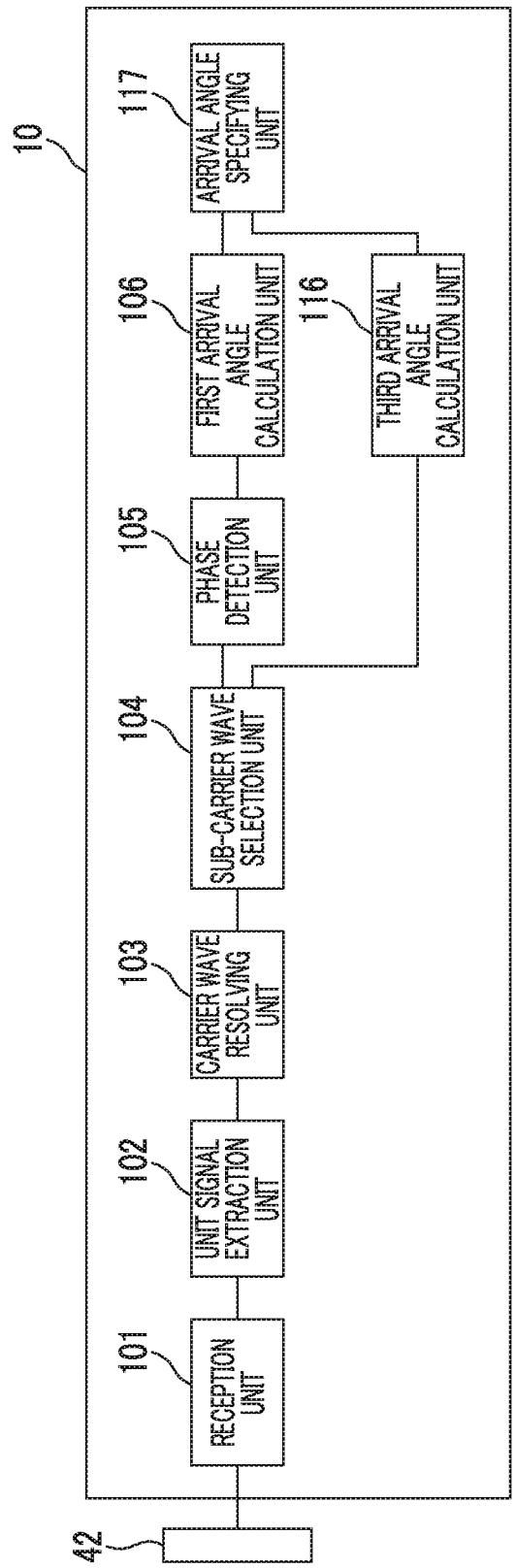
FIG. 10 is a view illustrating a functional configuration of a radio wave arrival angle detection device according to a fourth embodiment of the invention.

FIG. 10 is a view illustrating a functional configuration of a radio wave arrival angle detection device according to the fourth embodiment of the invention.

As illustrated in FIG. 10, a radio wave arrival angle detection device 10 includes a reception unit 101, a unit signal extraction unit 102, a carrier wave resolving unit 103, a sub-carrier wave selection unit 104, a phase detection unit 105, a first arrival angle calculation unit 106, a third arrival angle calculation unit 116, and an arrival angle specifying unit 117. In the fourth embodiment, an array antenna 42, in which a plurality of antenna elements are arranged, is used for reception of the carrier wave.

The third arrival angle calculation unit 116 calculates an arrival angle θ of the carrier wave on the basis of signal processing with respect to an amplitude and a phase of a sub-carrier that is selected by the sub-carrier wave selection unit 104 from a sub-carrier component signal group obtained by resolving a carrier wave that is received by the plurality of antenna elements provided in the array antenna 42. The third arrival angle calculation unit 116 performs signal processing based on a beam forming method that is a known method of estimating the arrival angle θ. The beam forming method is a method of searching a direction in which output power of the array antenna 42 is turned on by performing scanning of a main lobe (a range angle at which radiation characteristics are the highest with respect to the array antenna 42) of the array antenna 42 over the all directions by using an array antenna in which a plurality of antenna elements are arranged along a reference line. In the beam forming method, vector calculation (calculation using an amplitude value and a phase value) with respect to a carrier wave that is received by each of the antenna elements. According to this, the arrival angle θ, which is calculated by the third arrival angle calculation unit 116, has higher accuracy in comparison to the arrival angle θ that is calculated in the first to third embodiments. In addition, a method that is used for calculation of the arrival angle by the third arrival angle calculation unit 116 may be a method such as a CAPON method, a multiple signal classification (MUSIC) method, and an estimation of signal parameters via rotation invariance techniques (ESPRIT) method, in which resolution is higher, other than the above-described method.

The arrival angle specifying unit 117 acquires an arrival angle $\theta_a$, which is calculated by the first arrival angle calculation unit 106, from the first arrival angle calculation unit 106, and acquires an arrival angle $\theta_b$, which is calculated by the third arrival angle calculation unit 116, from the third arrival angle calculation unit 116. The arrival angle specifying unit 117 specifies the arrival angle θ of the carrier wave on the basis of the arrival angle $\theta_a$ and the arrival angle $\theta_b$. For example, in ordinary time, the arrival angle $\theta_b$ with the highest accuracy is specified as the arrival angle θ. In a case where abnormality occurs in calculation of the arrival angle in the third arrival angle calculation unit 116, and the like, the arrival angle $\theta_a$ may be specified as the arrival angle θ.

Furthermore, in this embodiment, with regard to a set of two antenna elements, which are provided at a predetermined interval, among the plurality of antenna elements which are arranged in the array antenna 42, the first arrival angle calculation unit 106 can calculate the arrival angle $\theta_a$ by the following Expression (1) on the basis of a phase difference of sub-carriers which are obtained by resolving a carrier wave received by the antenna elements and a distance between the antenna elements. The first arrival angle calculation unit 106 may select a plurality of sets of two antenna elements, and may calculate an average value of the arrival angle $\theta_a$ calculated with respect to each set, and the like.

Furthermore, description has been given of a case of a combination with the first embodiment as an example, but a combination with the second and third embodiments is also possible.

According to this embodiment, it is possible to calculate a radio wave arrival angle with higher accuracy.

<Fifth Embodiment>

Hereinafter, description will be given of a vehicle detection system according to a fifth embodiment of the invention with reference to FIG. 11 and FIG. 12.

Figure 11:
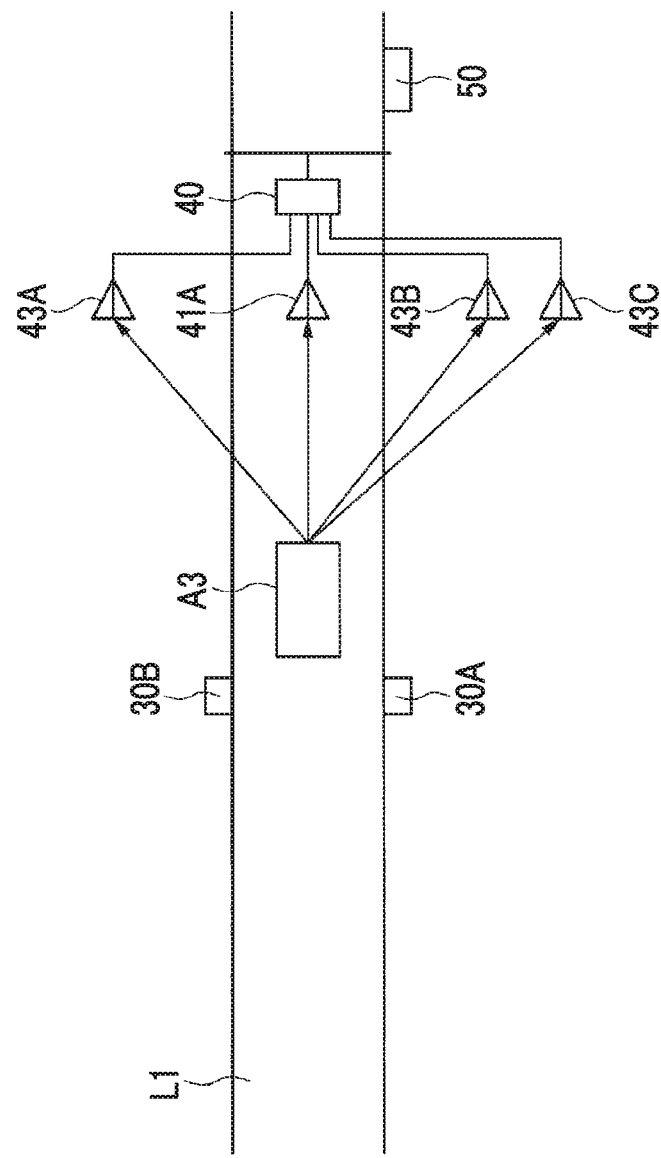
FIG. 11 is a view illustrating an overview of a vehicle detection system according to a fifth embodiment of the invention.

FIG. 11 is a view illustrating an overview of the vehicle detection system according to the fifth embodiment of the invention.

As illustrated in FIG. 11, in a vehicle detection system 1 of this embodiment, three antennas (antennas 43A to 43C) are provided in addition to the antenna 41A and the antenna 41B. The antennas 43A to 43C are provided with a sufficient distance there between.

Figure 12:
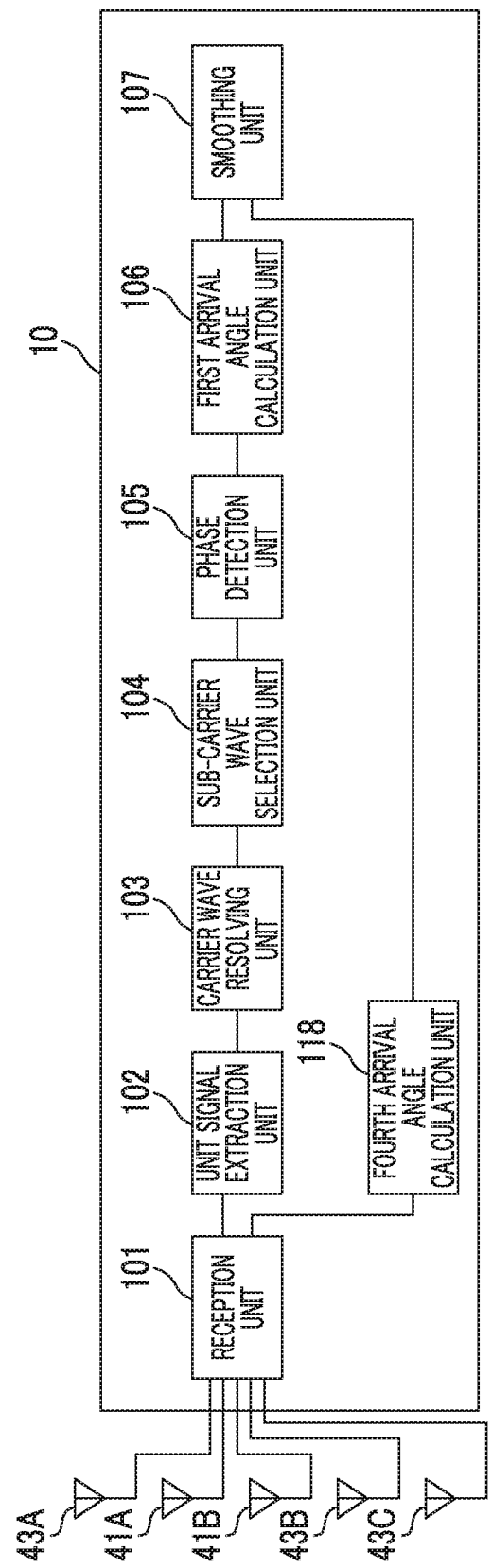
FIG. 12 is a view illustrating a functional configuration of radio wave arrival angle detection device according to the fifth embodiment of the invention.

FIG. 12 is a view illustrating a functional configuration of a radio wave arrival angle detection device according to the fifth embodiment of the invention.

As illustrated in FIG. 12, a radio wave arrival angle detection device 10 includes a reception unit 101, a unit signal extraction unit 102, a carrier wave resolving unit 103, a sub-carrier wave selection unit 104, a phase detection unit 105, a first arrival angle calculation unit 106, a smoothing unit 107, and a fourth arrival angle calculation unit 118.

The reception unit 101 acquires radio waves received by the antenna 43A, the antenna 43B, and the antenna 43C in addition to the antenna 41A and the antenna 41B.

The fourth arrival angle calculation unit 118 acquires radio waves, which are received by the antennas 43A to 43C, from the reception unit 101. The fourth arrival angle calculation unit 118 is provided with a timepiece that measures time. When the antenna 43A receives a radio wave transmitted from a vehicle A3, the fourth arrival angle calculation unit 118 records the time in a storage unit that is provided in the radio wave arrival angle detection device 10. In the same manner, the fourth arrival angle calculation unit 118 records time at which each of the antennas 43B and 43C receives a radio wave. The fourth arrival angle calculation unit 118 calculates a position of the vehicle A3 on the basis of time at which each of the antennas 43A to 43C receives a radio wave. For example, a time of arrival (TOA) type is used for calculation of the position. The TOA type is a method of calculating a position of a transmission source of a radio wave from time taken until the radio wave arrives at a plurality of antennas from the transmission source of the radio wave. The fourth arrival angle calculation unit 118 may calculate the position of the vehicle A3 by a time difference of arrival (TDOA) type, a received signal strength indicator (RSSI) type, and the like. The TDOA type is a type of calculating the position of the transmission source of the radio wave from a time difference of arrival of a radio wave at the plurality of antennas. The RSSI type is a type of calculating the position of the transmission source from intensity of the radio wave that arrives at the plurality of antennas and a calculated value of special attenuation of the radio wave.

When positional information of the vehicle A3 is calculated, the fourth arrival angle calculation unit 118 calculates an angle (vehicle position angle) which a straight line connecting the vehicle A3 and the antenna 41A and a plane parallel to the ground can intersect each other. The fourth arrival angle calculation unit 118 outputs the vehicle position angle, which is calculated, to the smoothing unit 107.

Furthermore, the fourth arrival angle calculation unit 118 may calculate the positional information of the vehicle A3 by two types among the TOA type, the TDOA type, and the RSSI type, or the entirety of the three types, and may calculate the vehicle position angle for each of the types.

The first arrival angle calculation unit 106 calculates an arrival angle of a radio wave in the same manner as in the first embodiment on the basis of radio waves received by the antenna 41A and 41B, and outputs the arrival angle to the smoothing unit 107. For example, the smoothing unit 107 obtains an average of the arrival angle according to the method of the first embodiment, and one or a plurality of vehicle position angles, and sets the value as a radio wave arrival angle θ. The smoothing unit 107 outputs the radio wave arrival angle θ to the erroneous detection prevention device 20.

According to this embodiment, a plurality of arrival angle calculation types are combined with each other, and thus it is possible to realize an improvement of arrival angle calculation accuracy.

Furthermore, description has been given of a case of a combination with the first embodiment, but a combination with the second to fourth embodiments is also possible. For example, in a case of a combination with the fourth embodiment, when the arrival angle in accordance with the beam forming method and the arrival angle calculated by another method (the first embodiment, the TOA type, the TDOA type, or the RSSI type) are greatly different from each other, and the arrival angle calculated by the other method is within a predetermined range, it is determined that the value calculated by the beam forming method includes an arbitrary error, and the arrival angle may be calculated on the basis of the other method.

<Sixth Embodiment>

Hereinafter, description will be given of a vehicle detection system according to a sixth embodiment of the invention with reference to FIG. 13 to FIG. 15B.

Figure 13:
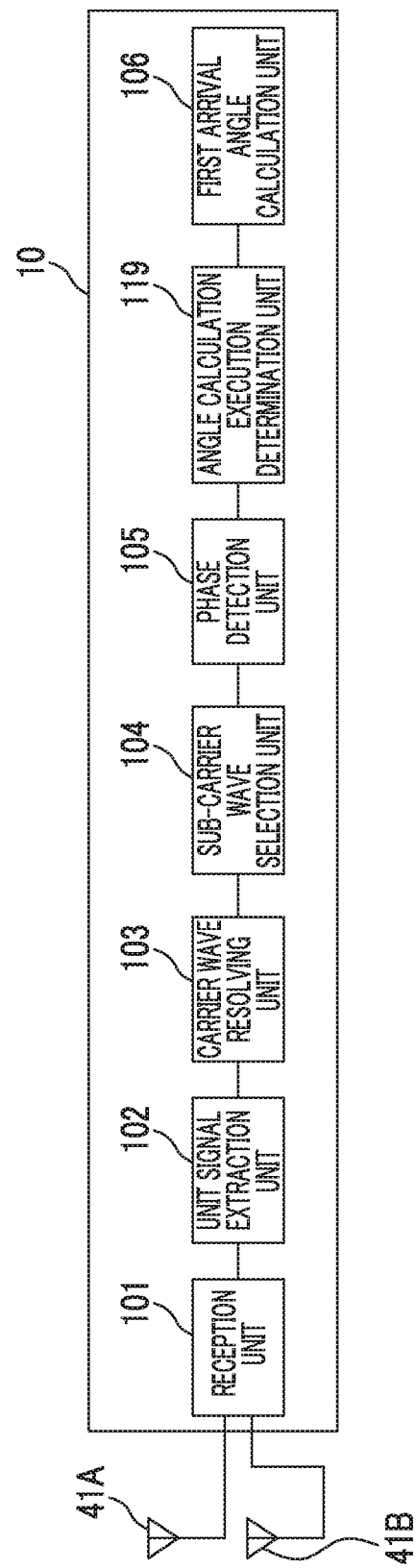
FIG. 13 is a view illustrating a functional configuration of radio wave arrival angle detection device according to a sixth embodiment of the invention.

FIG. 13 is a view illustrating a functional configuration of a radio wave arrival angle detection device according to the sixth embodiment of the invention.

As illustrated in FIG. 13, a radio wave arrival angle detection device 10 includes a reception unit 101, a unit signal extraction unit 102, a carrier wave resolving unit 103, a sub-carrier wave selection unit 104, a phase detection unit 105, a first arrival angle calculation unit 106, and an angle calculation execution determination unit 119.

With regard to sub-carriers included in carrier waves detected by a plurality of antennas, the angle calculation execution determination unit 119 determines whether or not to perform calculation of an arrival angle on the basis of a difference in phase or amplitude of the sub-carriers which is obtained through comparison between predetermined antennas. Specifically, when a magnitude of a phase difference or a difference in signal level between a first sub-carrier wave (sub-carrier Aα) and a second sub-carrier wave (sub-carrier Bα), which have the same frequency, is greater than a predetermined threshold value, the angle calculation execution determination unit 119 makes a determination as non-execution of calculation of the arrival angle. In a case where the angle calculation execution determination unit 119 makes a determination as execution of the calculation of the arrival angle, the first arrival angle calculation unit 106 of this embodiment performs the calculation of an arrival direction of a radio wave.

Figure 14:
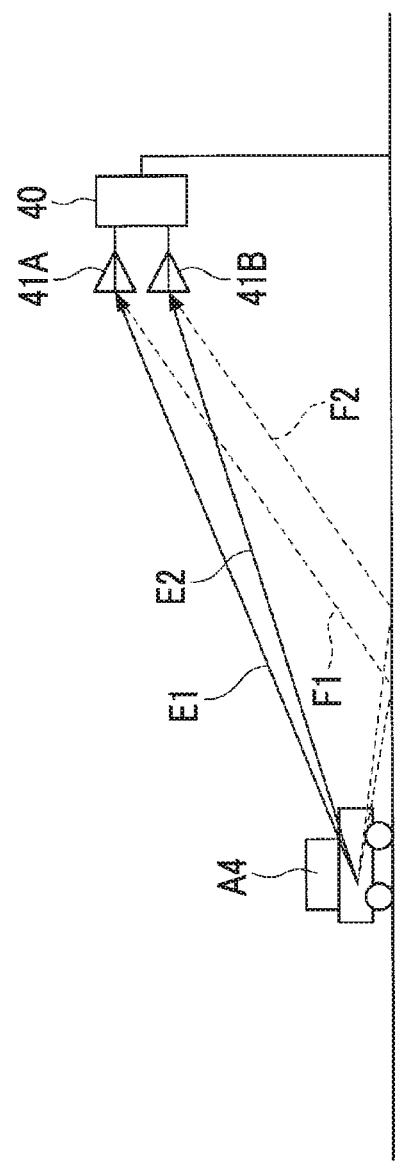
FIG. 14 is a first view illustrating angle calculation execution determination by an angle calculation execution determination unit according to the sixth embodiment of the invention.

FIG. 14 is a first view illustrating angle calculation execution determination by the angle calculation execution determination unit according to the sixth embodiment of the invention.

As illustrated in FIG. 14, the antenna 41A receives a direct wave E1 and a reflected wave F1 of a carrier wave transmitted from a vehicle A4. In the same manner, the antenna 41B receives a direct wave E2 and a reflected wave F2 of a carrier wave transmitted from a vehicle A4. In this manner, the carrier waves transmitted from the vehicle A4 arrives at the antennas 41A and 41B through various routes. Furthermore, the reflected wave F1 or F2 is an example of a reflected wave, and a plurality of reflected waves, which arrive at the antenna 41A and the like through various routes, actually exist. The reflected wave F1 arrives through a longer route in comparison to the direct wave E1, and thus a deviation occurs between phases of the direct wave E1 and the reflected wave F1. The antenna 41A receives the direct wave E1 and combined waves of a plurality of the reflected waves F1 and the like. This is also true of the antenna 41B. So-called fading, in which a signal level varies due to interference between the direct wave E1 and the reflected wave F1, occurs in carrier waves which are received by the antenna 41A and the antenna 41B.

In this embodiment, as is the case with the first embodiment, with regard to carrier waves received by the antenna 41A and the antenna 41B, the unit signal extraction unit 102 extracts a symbol, and the carrier wave resolving unit 103 resolves the carrier waves into a sub-carrier component signal group through the FFT. The sub-carrier wave selection unit 104 selects sub-carriers, which have the same frequency, from a sub-carrier component signal group A related to the antenna 41A and a sub-carrier component signal group B related to the antenna 41B, and the phase detection unit 105 detects a phase of each of the sub-carriers. The angle calculation execution determination unit 119 compares signal levels of a sub-carrier Aα that relates to the antenna 41A and is selected by the sub-carrier wave selection unit 104, and a sub-carrier Bα that relates to the antenna 41B and is selected by the sub-carrier wave selection unit 104. Alternatively, the angle calculation execution determination unit 119 compares phases of the sub-carrier Aα and the sub-carrier Bα which are detected by the phase detection unit 105. From a comparison result, in a case where a difference value between the signal levels is out of a permissible range that is determined in advance with respect to the signal level, in a case where a difference value between the phases is out of a permissible range that is determined in advance with respect to the phase difference, or both of the conditions are satisfied, even when calculating the arrival angle by using the sub-carrier Aα and the sub-carrier Bα, the angle calculation execution determination unit 119 determines that it is difficult to calculate an accurate arrival angle due to an influence of the fading, and makes a determination as non-execution of calculation of the arrival angle. In a case where the difference value between the signal levels, or the phase difference is within a predetermined range, the angle calculation execution determination unit 119 makes a determination as execution of calculation of the arrival angle.

Figure 15A:
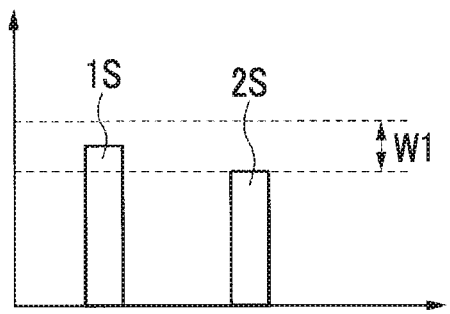
FIG. 15A is a second view illustrating the angle calculation execution determination by the angle calculation execution determination unit according to the sixth embodiment of the invention.

FIG. 15A is a second view illustrating angle calculation execution determination by the angle calculation execution determination unit according to the sixth embodiment of the invention.

Figure 15B:
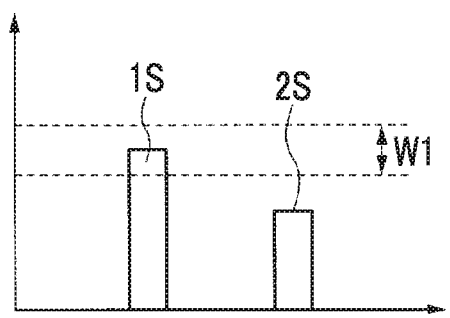
FIG. 15B is a third view illustrating the angle calculation execution determination by the angle calculation execution determination unit according to the sixth embodiment of the invention.

FIG. 15B is a third view illustrating the angle calculation execution determination by the angle calculation execution determination unit according to the sixth embodiment of the invention.

FIG. 15A is a view illustrating an example of signal levels of the sub-carrier Aα related to the antenna 41A and the sub-carrier Bα related to the antenna 41B in a case where the angle calculation execution determination unit 119 makes a determination as execution of calculation of the arrival angle. A signal level 1S is a signal level of the sub-carrier Aα related to the antenna 41A. A signal level 2S is a signal level of the sub-carrier Bα related to the antenna 41B. A range W1 is a permissible range that is determined in advance with respect to the signal level. In a case of FIG. 15A, difference value between the signal level 1S and the signal level 2S is equal to or less than the permissible range W1, and thus the angle calculation execution determination unit 119 makes a determination as execution of calculation of the arrival angle.

FIG. 15B is a view illustrating an example of signal levels of the sub-carrier Aα related to the antenna 41A and the sub-carrier Bα related to the antenna 41B in a case where the angle calculation execution determination unit 119 makes a determination as non-execution of calculation of the arrival angle. In a case of FIG. 15B, a difference value between the signal level 1S and the signal level 2S is greater than the permissible range W1, and thus the angle calculation execution determination unit 119 makes a determination as non-execution of calculation of the arrival angle.

FIG. 15A and FIG. 15B are views related to a case of determination on the signal level. The angle calculation execution determination unit 119 may make a determination on whether or not to execute calculation of the arrival angle on the basis of the phase difference between the sub carriers, or may make a determination on whether or not to execute calculation of the arrival angle on the basis of both of the signal level and the phase difference.

With respect to the sub-carriers related to the antenna 41A and the antenna 41B, the angle calculation execution determination unit 119 may select a plurality of frequency components, may calculate an average value of signal levels or phase differences of the plurality of sub-carriers, and the like, and may compare the average value and the like for determination on whether or not to execute angle calculation.

According to this embodiment, it is possible to reduce an angle detection error due to the fading in a multi-path environment in which a reflected wave exists. Furthermore, this embodiment may be combined with any one of the first to fifth embodiments.

<Seventh Embodiment>

Hereinafter, description will be given of a vehicle detection system according to a seventh embodiment of the invention with reference to FIG. 16A and FIG. 16B.

In the sixth embodiment, the angle calculation execution determination unit 119 makes a determination on whether or not to execute angle calculation on the basis of a difference in signal level of antennas and a phase difference. In the seventh embodiment, the angle calculation execution determination unit 119 compares signal levels between sub-carriers of the same antenna, and when a magnitude of a difference in signal level is greater than a predetermined threshold value, the angle calculation execution determination unit 119 makes a determination as non-execution of calculation of the arrival angle.

Figure 16A:
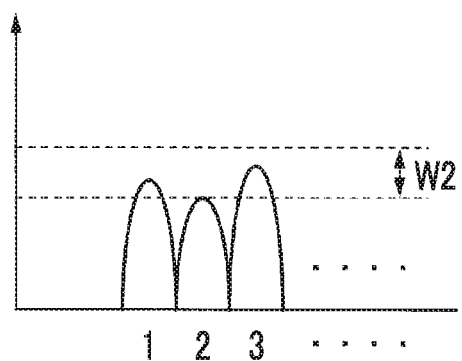
FIG. 16A is first view illustrating angle calculation execution determination by an angle calculation execution determination unit according to a seventh embodiment of the invention.

FIG. 16A is a first view illustrating angle calculation execution determination by an angle calculation execution determination unit according to the seventh embodiment of the invention.

Figure 16B:
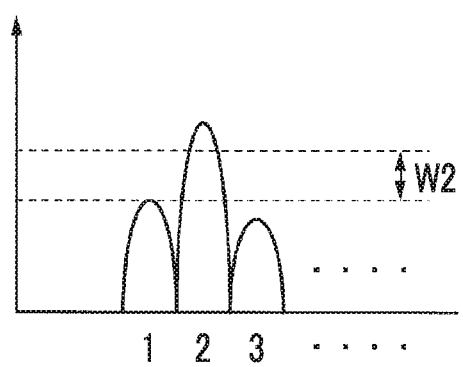
FIG. 16B is a second view illustrating the angle calculation execution determination by the angle calculation execution determination unit according to the seventh embodiment of the invention.

FIG. 16B is a second view illustrating the angle calculation execution determination by the angle calculation execution determination unit according to the seventh embodiment of the invention.

FIG. 16A is a view illustrating an example of signal levels of a plurality of sub-carriers related to the antenna 41A in a case where the angle calculation execution determination unit 119 makes a determination as execution of calculation of the arrival angle. Signal levels of a sub-carrier 1, a sub-carrier 2, and a sub-carrier 3 are illustrated in this order from a left side. A range W2 is a permissible range that is determined in advance with respect to the signal level. In a case of FIG. 16A, the signal levels of the sub-carriers 1 to 3 is within the range W2, and thus the angle calculation execution determination unit 119 makes a determination as execution of calculation of the arrival angle.

FIG. 16B is a view illustrating an example of signal levels of a plurality of sub-carriers related to the antenna 41A in a case where the angle calculation execution determination unit 119 makes a determination as non-execution of calculation of the arrival angle. In a case of FIG. 16B, a difference value between signal levels of the sub-carrier 1 and the sub-carrier 2, and a difference value between signal levels of the sub-carrier 2 and the sub-carrier 3 exceed the range W2, and thus the angle calculation execution determination unit 119 makes a determination as non-execution of calculation of the arrival angle.

A phase of a reflected wave greatly varies even in the same route in accordance with a frequency. In a case where signal levels are compared with respect to a plurality of sub-carriers which are different in frequency, and a difference in signal level is great, there is a possibility that an amplitude of a combined wave greatly varies with respect to one or a plurality of frequencies due to an influence of the fading. In this situation, even when the arrival angle is calculated with focus given to a sub-carrier having a predetermined frequency, it is difficult to grasp the degree of influence of the fading with respect to the sub-carrier, and thus accuracy of a calculated arrival angle is unclear. Accordingly, in this situation, the angle calculation execution determination unit 119 makes a determination as non-execution of calculation of the arrival angle.

According to this embodiment, in a multi-path environment in which a reflected wave exists, it is possible to reduce an angle detection error due to the fading. Furthermore, the seventh embodiment may be combined with the first to sixth embodiments.

Furthermore, the procedure of each of a plurality of kinds of the processing in the above-described radio wave arrival angle detection device 10 is stored in a computer-readable recording medium in a program type, and the processing may be performed when the program is read out and executed by a computer of the radio wave arrival angle detection device 10. Here, the computer-readable recording medium represents a magnetic disk, a magneto-optical disc, a CD-ROM, a DVD-ROM, a semiconductor memory, and the like. A computer program may be transmitted to the computer over a communication line, and the computer, which receives the program, may execute the program.

The program may be configured to realize a part of the above-described functions. In addition, the program may be a so-called differential file (differential program) which is capable of realizing the above-described functions in a combination of a program that is recorded in a computer system in advance.

The radio wave arrival angle detection device 10 may be constituted by one computer, or may be constituted by a plurality of computers which are connected to each other in a communication-possible manner.

The constituent elements in the above-described embodiments can be appropriately substituted with known constituent elements in a range not departing from the gist of the invention. The technical range of the invention is not limited to the above-described embodiments, and various modifications can be made in a range not departing from the gist of the invention. Furthermore, the third arrival angle calculation unit 116 is an example of a signal processing unit, and the fourth arrival angle calculation unit 118 is an example of a position estimation unit.

INDUSTRIAL APPLICABILITY

According to the radio wave arrival angle detection device, the vehicle detection system, the radio wave arrival angle detection method, and the vehicle erroneous detection prevention method, it is possible to detect an arrival angle of a carrier wave in an OFDM type radio communication. According to this, it is possible to prevent erroneous detection of a vehicle.

REFERENCE SIGNS LIST

1: Vehicle detection system
10: Radio wave arrival angle detection device
101: Reception unit
102: Unit signal extraction unit
103: Carrier wave resolving unit
104: Sub-carrier wave selection unit
105: Phase detection unit
106: First arrival angle calculation unit
107: Smoothing unit
108: Intermediate frequency band conversion unit
109: Sampling unit
110: Second arrival angle calculation unit
111: Band-pass filter
112: Local oscillator
113: Mixer
114: Band-pass filter
115: A/D converter
116: Third arrival angle calculation unit
117: Arrival angle specifying unit
118: Fourth arrival angle calculation unit
119: Angle calculation execution determination unit
20: Erroneous detection prevention device
201: Arrival angle information acquisition unit
202: Erroneous detection determination unit
203: Determination result transmission unit
30A, 30B: Vehicle detector
40: Radio communication device
41A, 41B, 43A, 43B, 43C: Antenna
42: Array antenna
50: Road side charging system
L1, L2, L3: Lane
A1, A2, A3, A4, A5: Vehicle

The invention claimed is:

1. A radio wave arrival angle detection device, comprising:
a carrier wave resolving unit that resolves a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other; and
an arrival angle calculation unit that calculates an arrival angle of the first carrier wave at the first antenna or an arrival angle of the second carrier wave at the second antenna on the basis of a geometric relationship between a phase difference between a first sub-carrier wave and a second sub-carrier wave and arrangement positions of the first antenna and the second antenna,
wherein the first sub-carrier wave is selected from a first sub-carrier wave group obtained by resolving the first carrier wave by the carrier wave resolving unit, and
wherein the second sub-carrier wave is selected from a second sub-carrier wave group obtained by resolving the second carrier wave by the carrier wave resolving unit and has the same frequency as a frequency of the first sub-carrier wave.

2. The radio wave arrival angle detection device according to claim 1, further comprising:
a smoothing unit that selects a set of the first sub-carrier wave and the second sub-carrier wave which have the same frequency with respect to a plurality of frequencies, and smooths an arrival angle obtained through calculation by the arrival angle calculation unit for each of the frequencies.

3. The radio wave arrival angle detection device according to claim 1, further comprising:
a unit signal extraction unit that extracts a unit signal, which constitutes the carrier wave, by detecting a redundant signal that is applied to a head of the unit signal,
wherein the unit signal extraction unit extracts a first unit signal from the first carrier wave and a second unit signal from the second carrier wave, respectively,
the carrier wave resolving unit resolves the first unit signal into the first sub-carrier wave group, and the second unit signal into the second sub-carrier wave group, respectively, and
the arrival angle calculation unit calculates the arrival angle on the basis of the geometric relationship between the phase difference between the first sub-carrier wave selected from the first sub-carrier wave group, and the second sub-carrier wave that is selected from the second sub-carrier wave group and has the same frequency as a frequency of the first sub-carrier wave, and the arrangement positions of the first antenna and the second antenna.

4. The radio wave arrival angle detection device according to claim 1, further comprising:
   an intermediate frequency band conversion unit that converts a frequency of the carrier wave into an intermediate frequency; and
   a sampling unit that samples three or greater partial signals having a predetermined length from the carrier wave, which is converted by the intermediate frequency band conversion unit, with the passage of time,
   wherein the carrier wave resolving unit resolves each of three or greater partial signals, which are sampled from the first carrier wave by the sampling unit, into a first sub-carrier wave group corresponding to each of the partial signals, and resolves each of three or greater partial signals, which are sampled from the second carrier wave, into a second sub-carrier wave group corresponding to each of the partial signals, and
   with respect to all sets of the first sub-carrier wave group and the second sub-carrier wave group in which sampling time is set to the same as each other, the arrival angle calculation unit compares arrival angle calculation values calculated by using the first sub-carrier wave selected from the first sub-carrier wave group and the second sub-carrier wave that is selected from the second sub-carrier wave group and has the same frequency as a frequency of the first sub-carrier wave in each of the sets, and calculates the arrival angle on the basis of a plurality of the arrival angle calculation values in which a difference of the arrival angle calculation values is in a predetermined range.

5. The radio wave arrival angle detection device according to claim 1, further comprising:
   a signal processing unit that calculates the arrival angle of the carrier wave on the basis of signal processing with respect to an amplitude and a phase of the sub-carrier wave included in the carrier wave that is received by a plurality of antenna elements of an array antenna.

6. The radio wave arrival angle detection device according to claim 1, further comprising:
   a position estimation unit that calculates a transmission position of the carrier wave by using reception time or radio wave intensity of the carrier wave that is received by each of two or greater antennas,
   wherein the arrival angle calculation unit calculates the arrival angle by using an arrival angle of the carrier wave based on the transmission position that is represented by a positional relationship between the transmission position and the first antenna or the second antenna.

7. The radio wave arrival angle detection device according to claim 1, further comprising:
   an angle calculation execution determination unit that determines whether or not to perform calculation of the arrival angle on the basis of a magnitude of a phase difference or a difference in signal level which is obtained through comparison between a plurality of the sub-carrier waves,
   wherein the arrival angle calculation unit performs calculation of an arrival direction only in a case where the angle calculation execution determination unit makes a determination as execution of calculation of the arrival direction.

8. The radio wave arrival angle detection device according to claim 7,
   wherein when the magnitude of the phase difference or the difference in signal level between the first sub-carrier wave and the second sub-carrier wave, which have the same frequency, is greater than a predetermined threshold value, the angle calculation execution determination unit makes a determination as non-execution of calculation of the arrival angle.

9. The radio wave arrival angle detection device according to claim 7,
   wherein with respect to at least one of the first sub-carrier wave group and the second sub-carrier wave group, the angle calculation execution determination unit compares signal levels between a plurality of sub-carrier waves included in the sub-carrier wave group, and makes a determination as non-execution of calculation of the arrival angle when a magnitude of the difference in signal level is greater than a predetermined threshold value.

10. A vehicle detection system, comprising:
    the radio wave arrival angle detection device according to claim 1; and
    an erroneous detection prevention device,
    wherein the erroneous detection prevention device includes an erroneous detection determination unit that determines whether or not the arrival angle calculated by the radio wave arrival angle detection device is included in a predetermined angle range corresponding to a position at which a vehicle to be detected exists.

11. A radio wave arrival angle detection method, comprising:
    resolving a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other; and
    calculating an arrival angle of the first carrier wave at the first antenna or an arrival angle of the second carrier wave at the second antenna on the basis of a geometric relationship between a phase difference between a first sub-carrier wave and a second sub-carrier wave and arrangement positions of the first antenna and the second antenna,
    wherein the first sub-carrier wave is selected from a first sub-carrier wave group obtained by resolving the first carrier wave by the carrier wave resolving unit, and
    wherein the second sub-carrier wave is selected from a second sub-carrier wave group obtained by resolving the second carrier wave by the carrier wave resolving unit and has the same frequency as a frequency of the first sub-carrier wave.

12. A vehicle erroneous detection prevention method, comprising:
    resolving a partial signal, which is extracted from a single unit signal among a plurality of unit signals which constitute signals transmitted by a first carrier wave and a second carrier wave, into a sub-carrier wave group that is constituted by a plurality of sub-carrier waves with respect to each of the first carrier wave received by a first antenna and the second carrier wave received by a second antenna, the first carrier wave and the second carrier wave being carrier waves obtained by multiplexing the plurality of sub-carrier waves having frequencies different from each other;

calculating an arrival angle of the first carrier wave at the first antenna or an arrival angle of the second carrier wave at the second antenna on the basis of a geometric relationship between a phase difference between a first sub-carrier wave and a second sub-carrier wave and arrangement positions of the first antenna and the second antenna, wherein the first sub-carrier wave is selected from a first sub-carrier wave group obtained by resolving the first carrier wave by the carrier wave resolving unit, and wherein the second sub-carrier wave is selected from a second sub-carrier wave group obtained by resolving the second carrier wave by the carrier wave resolving unit and has the same frequency as a frequency of the first sub-carrier wave; and determining whether or not the arrival angle that is calculated is included in a predetermined angle range corresponding to a position at which a vehicle to be detected exists.

\* \* \* \* \*